Jan. 22, 1952     E. BRUCE ET AL     2,582,959
ELECTRON-TUBE CONTROLLED SWITCHING SYSTEM
Filed Oct. 29, 1947     17 Sheets-Sheet 1

INVENTORS: E. BRUCE
N. I. HALL
BY William F. Simpson
ATTORNEY

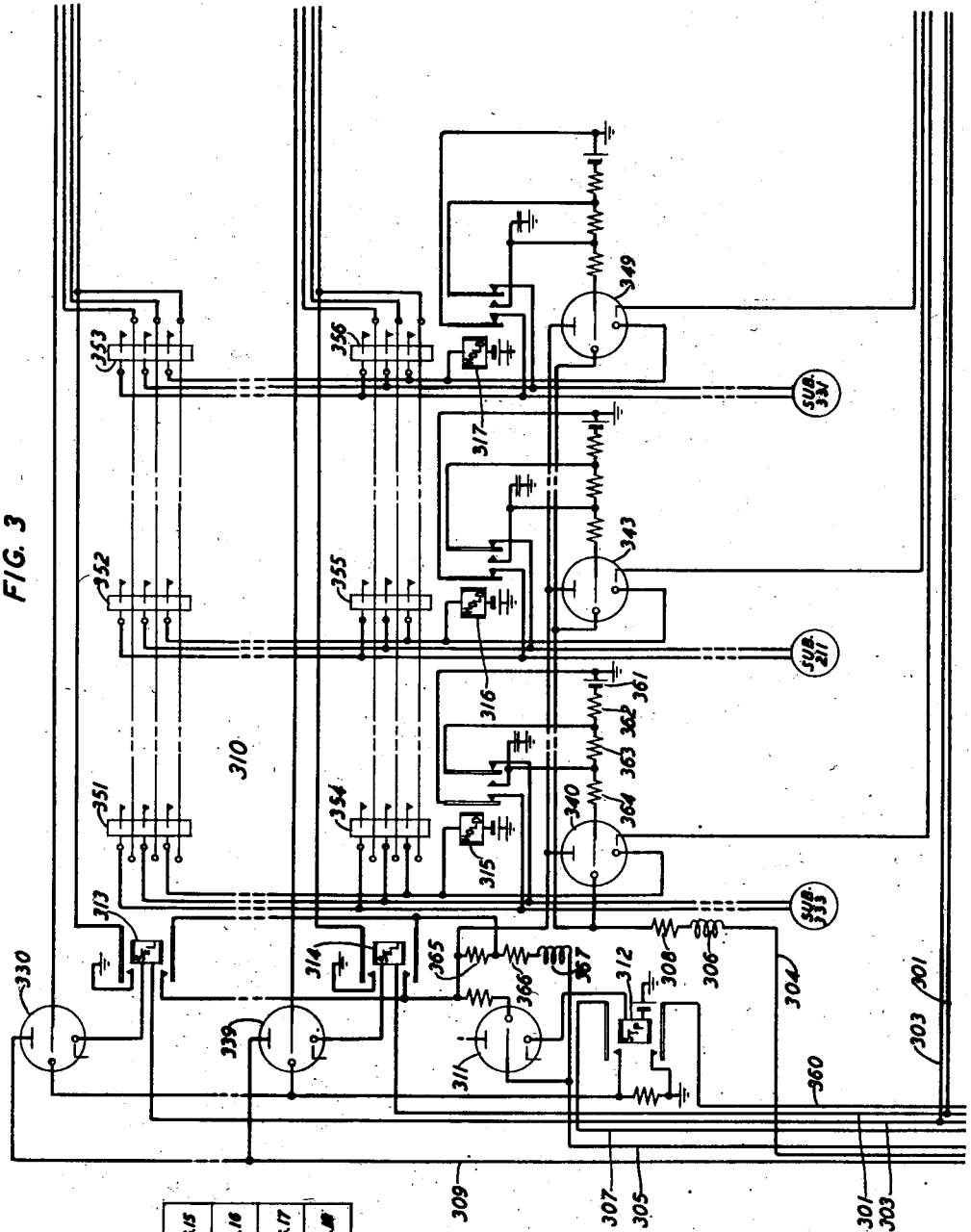

Jan. 22, 1952 E. BRUCE ET AL 2,582,959
ELECTRON-TUBE CONTROLLED SWITCHING SYSTEM
Filed Oct. 29, 1947 17 Sheets-Sheet 3
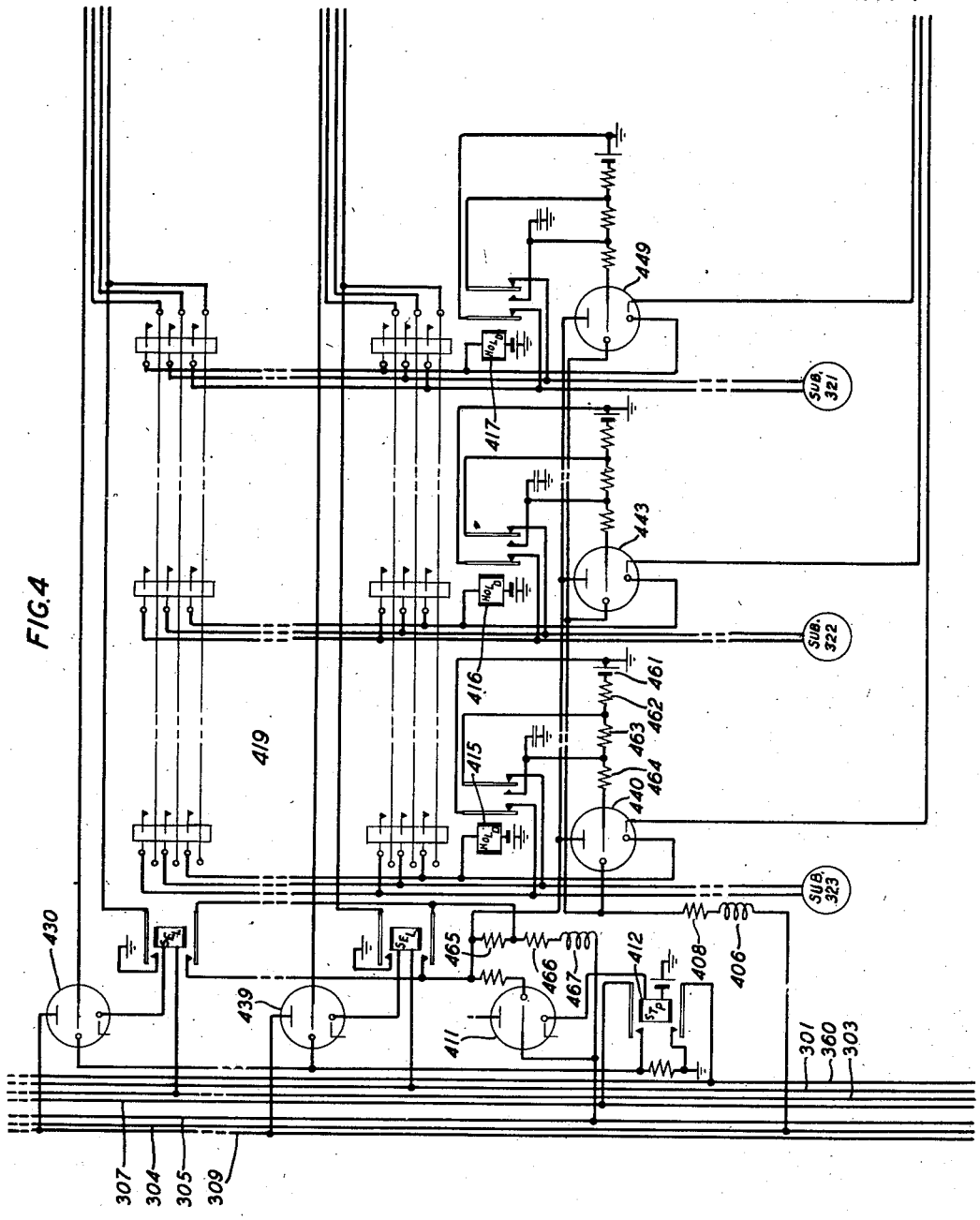
INVENTORS: E. BRUCE
N. I. HALL
BY William F. Simpson.
ATTORNEY

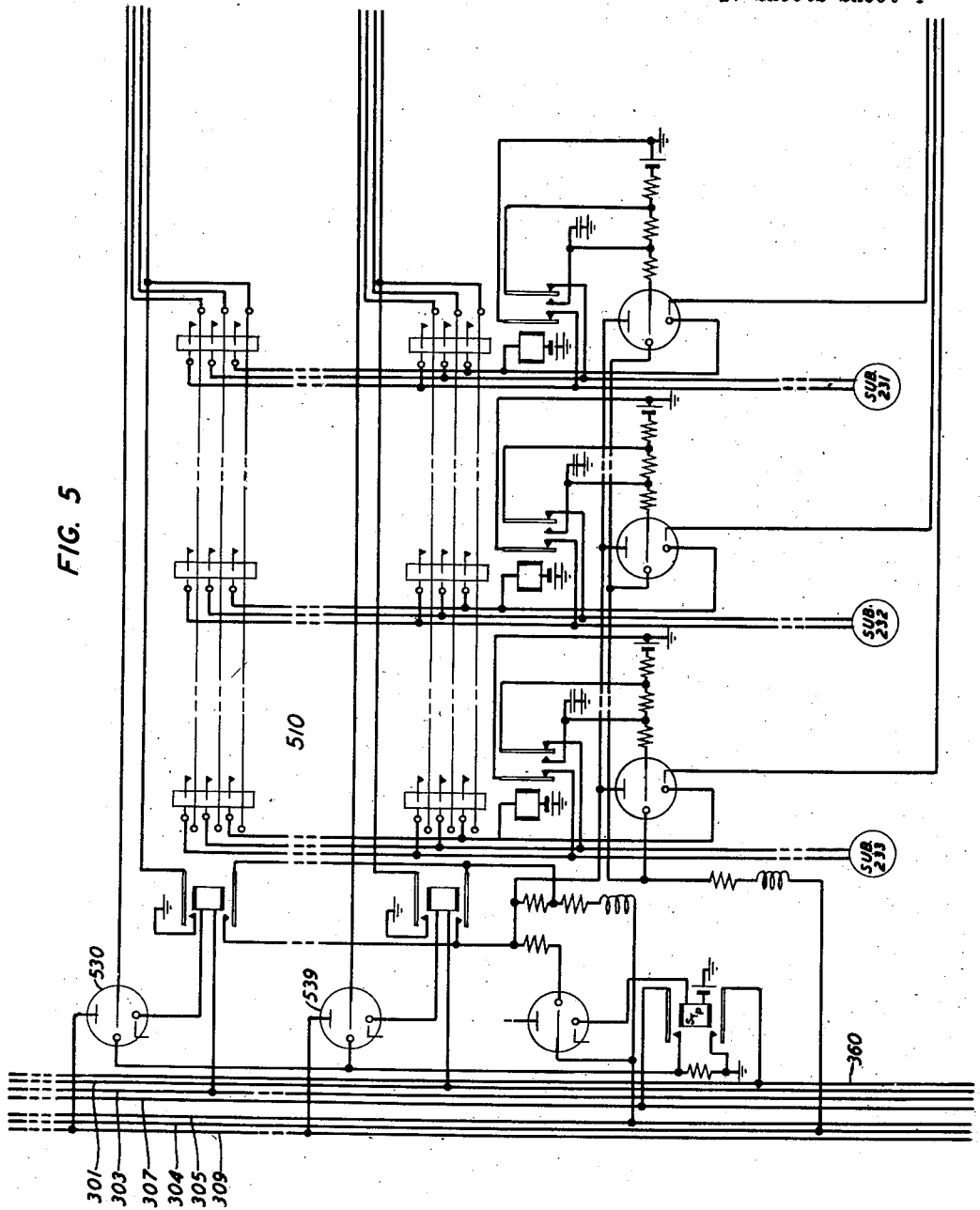

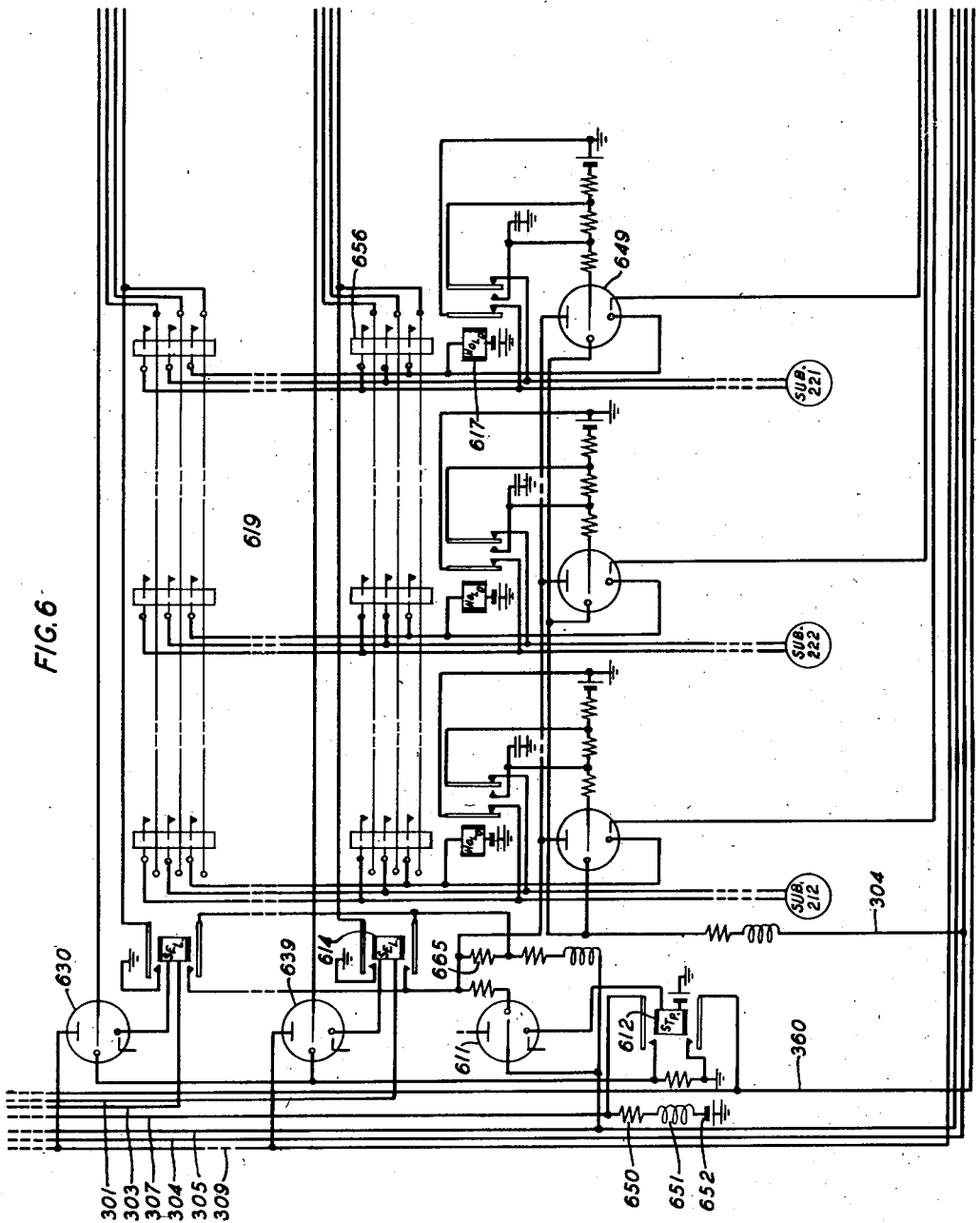

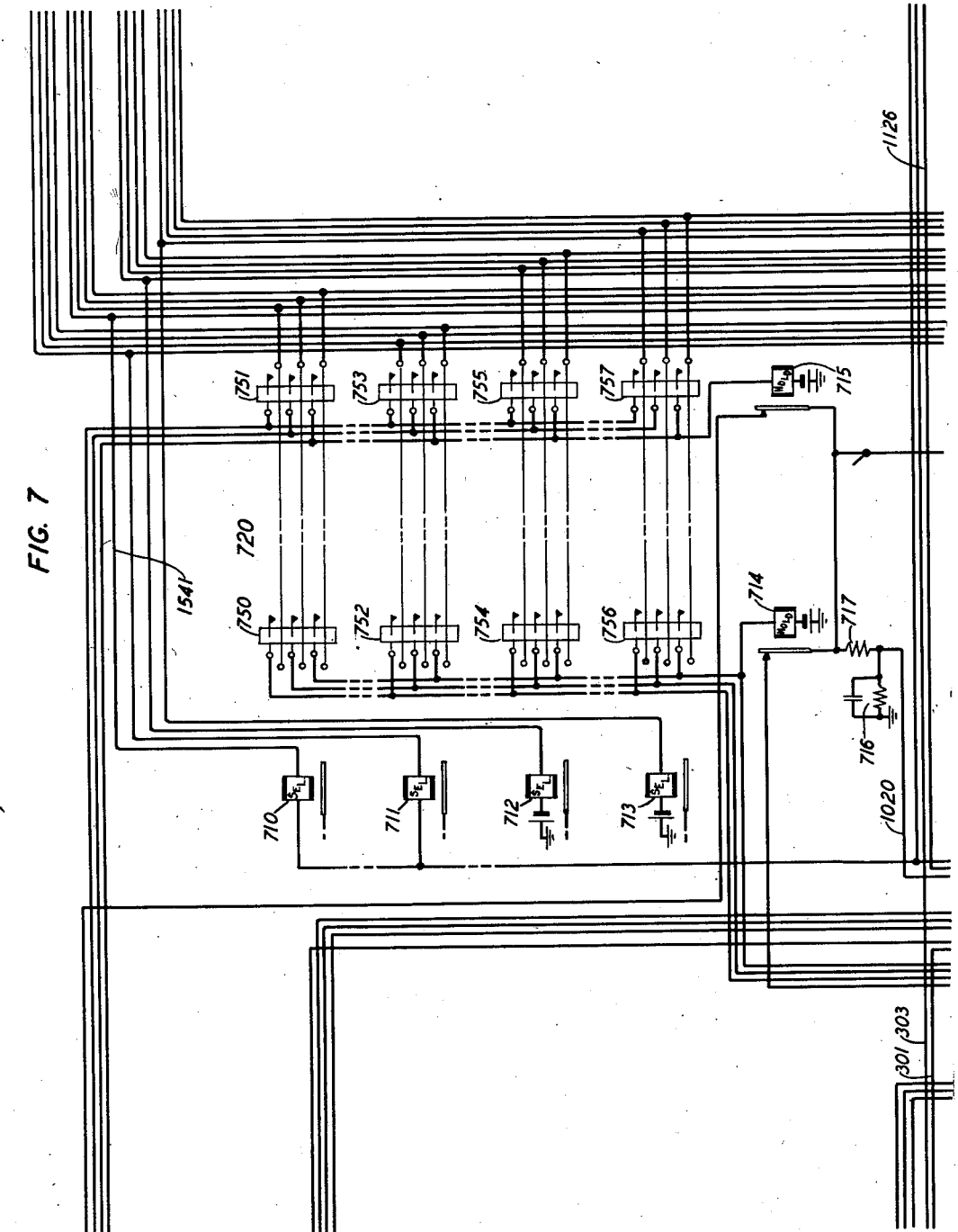

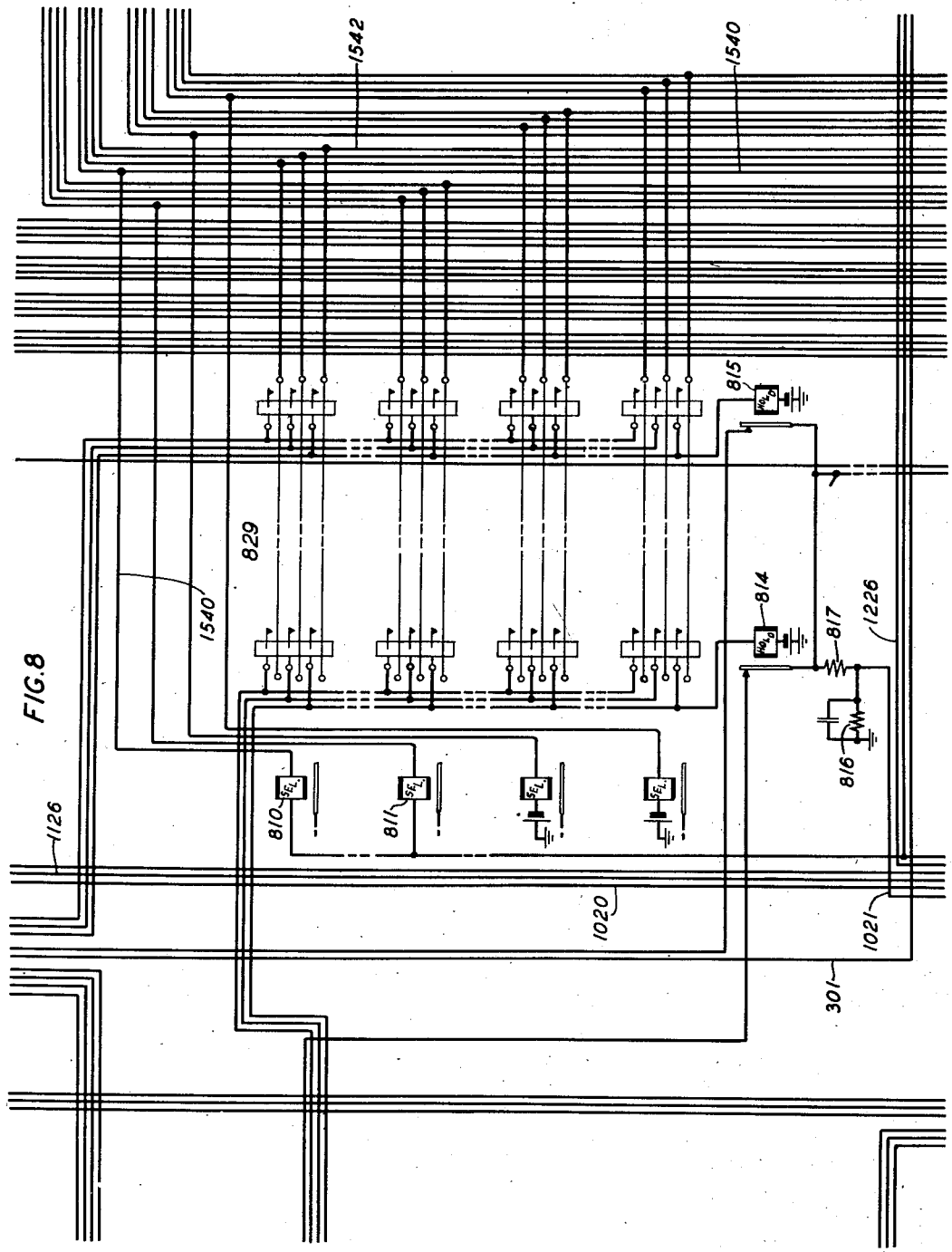

Jan. 22, 1952  E. BRUCE ET AL  2,582,959
ELECTRON-TUBE CONTROLLED SWITCHING SYSTEM
Filed Oct. 29, 1947  17 Sheets-Sheet 8
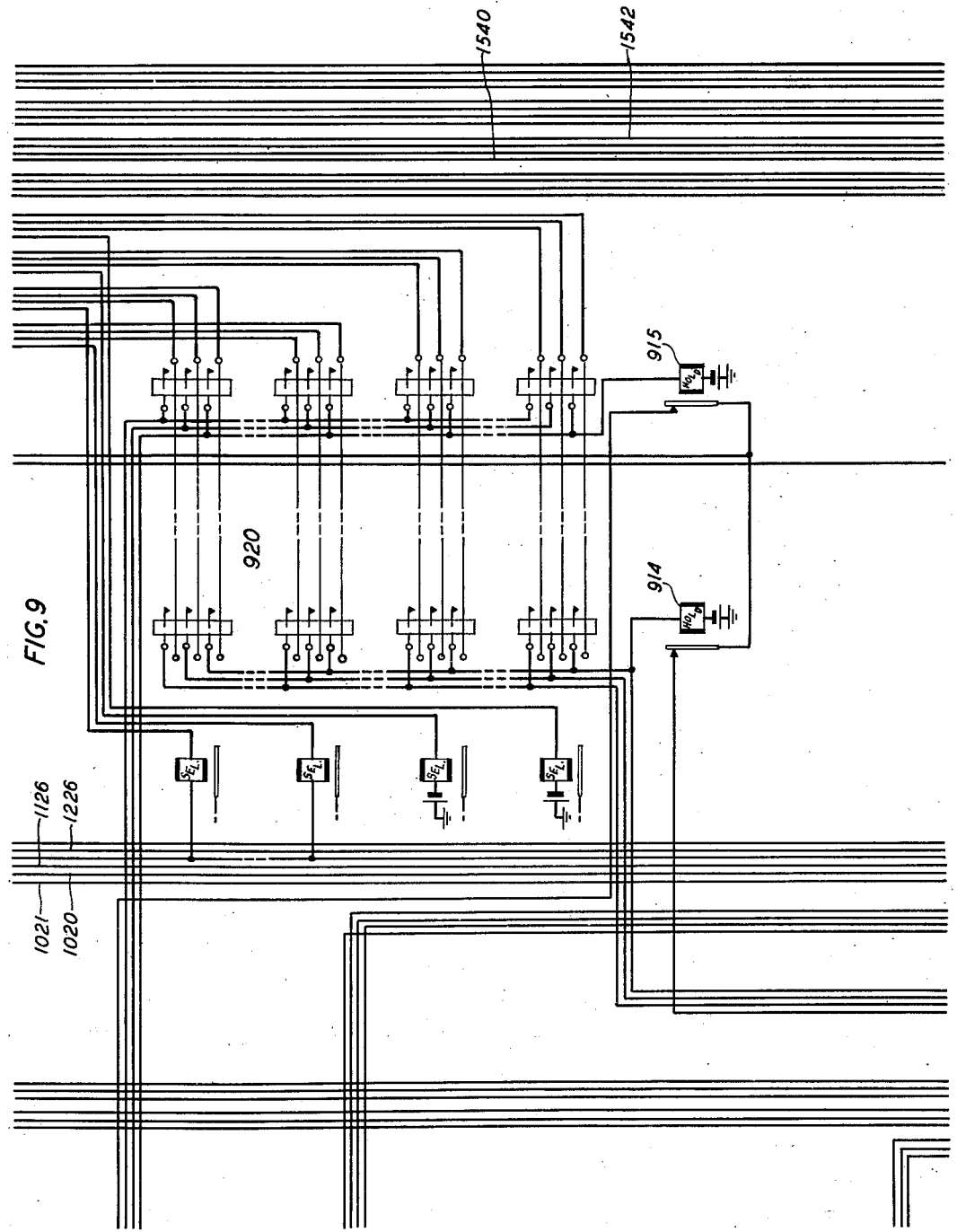
INVENTORS: E. BRUCE
N. I HALL
BY William F. Simpson.
ATTORNEY

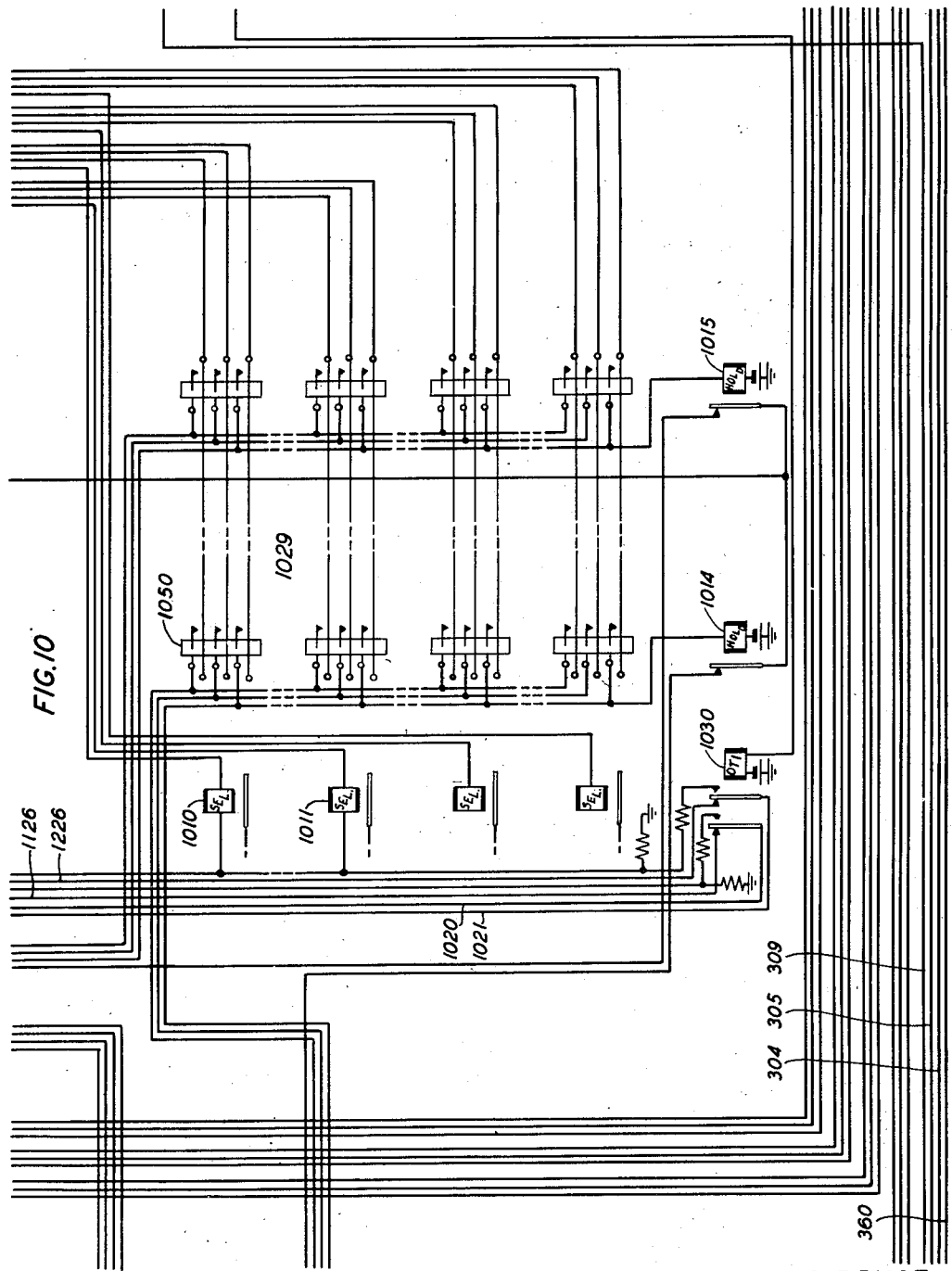

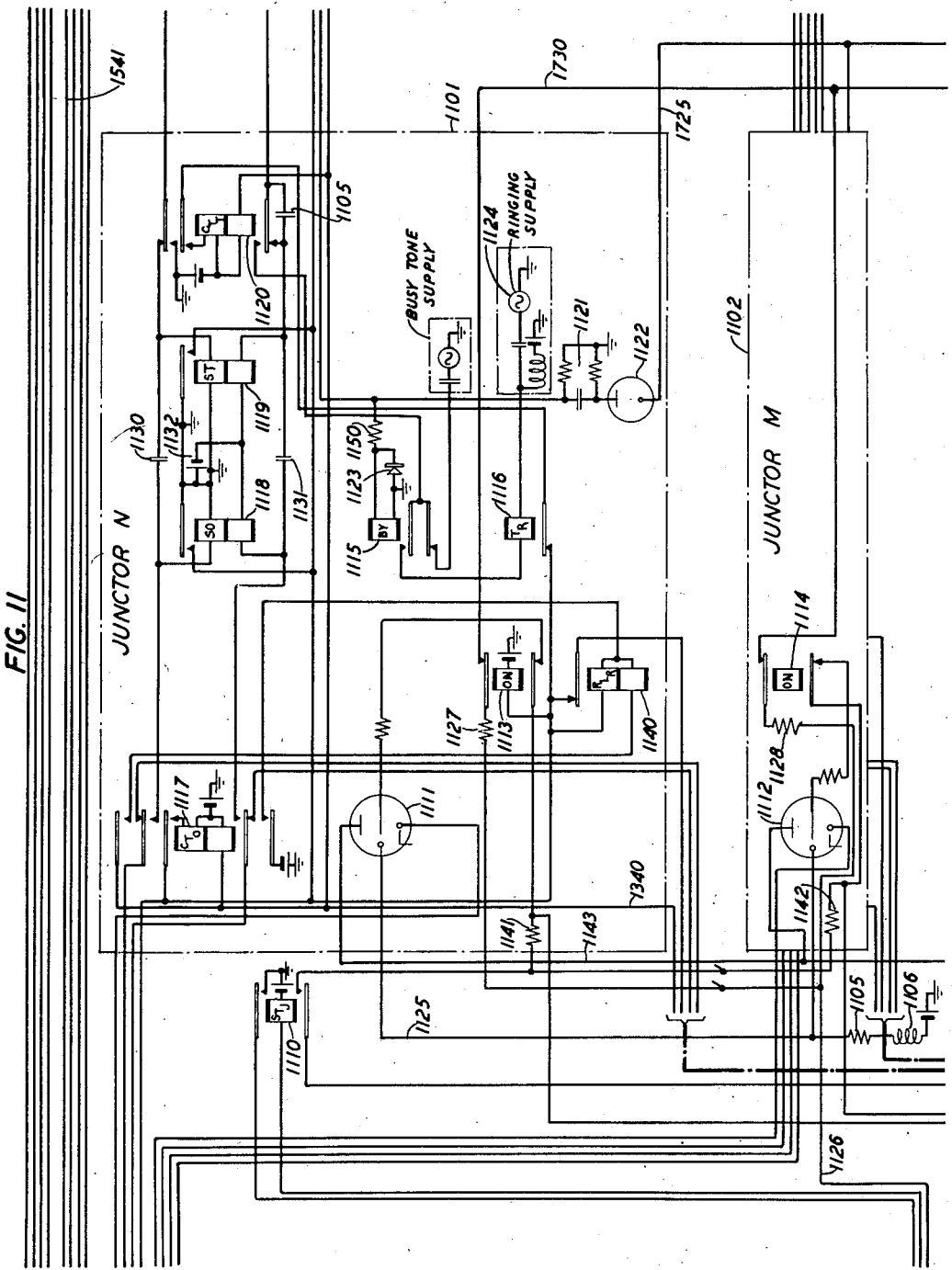

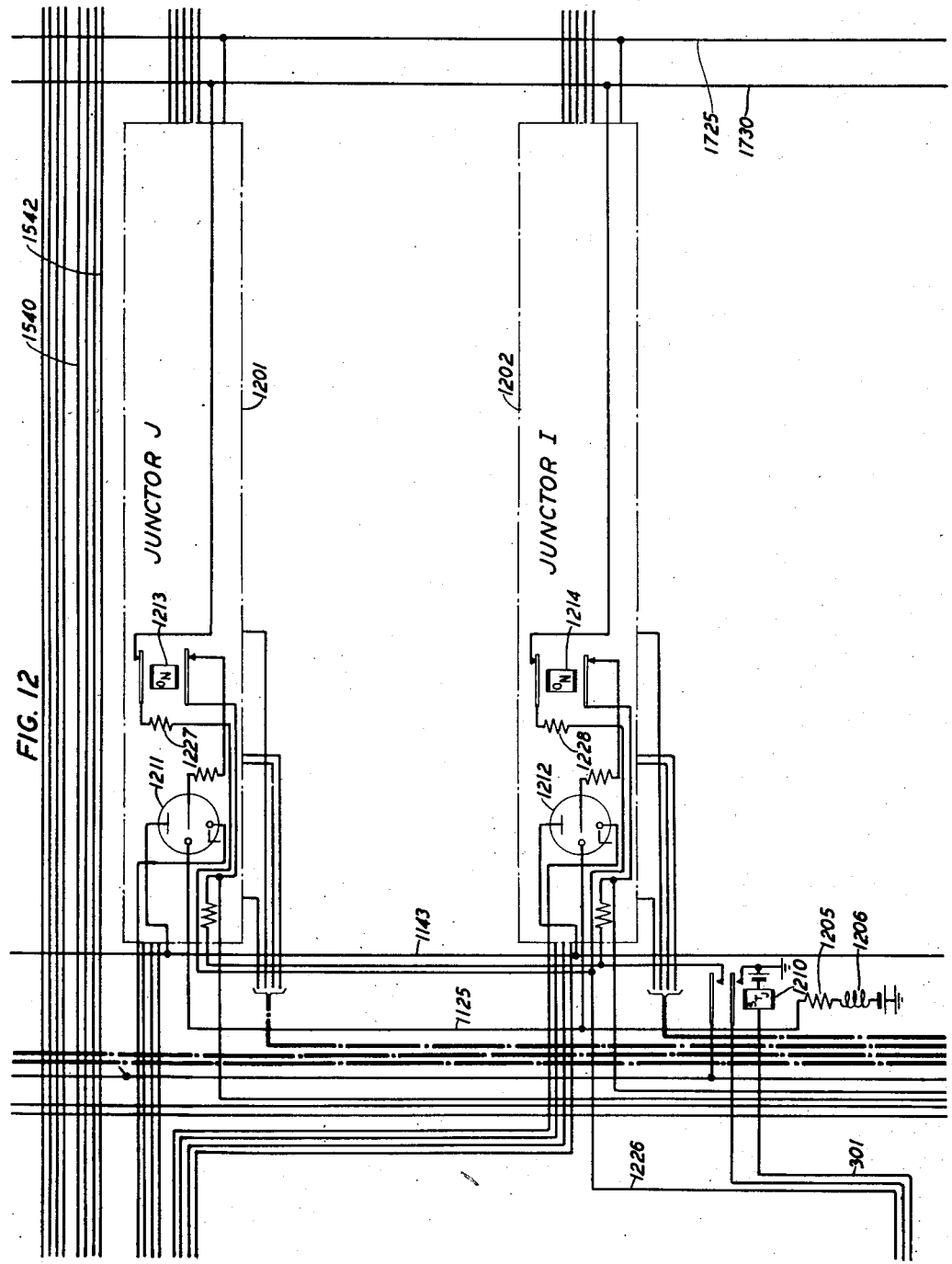

INVENTORS: E. BRUCE
N. I. HALL
BY William F. Simpson
ATTORNEY

Jan. 22, 1952     E. BRUCE ET AL     2,582,959
ELECTRON-TUBE CONTROLLED SWITCHING SYSTEM
Filed Oct. 29, 1947     17 Sheets-Sheet 15

INVENTORS: E. BRUCE
N. I. HALL
BY William F. Simpson
ATTORNEY

Jan. 22, 1952  E. BRUCE ET AL  2,582,959
ELECTRON-TUBE CONTROLLED SWITCHING SYSTEM
Filed Oct. 29, 1947  17 Sheets-Sheet 17

INVENTORS: E. BRUCE
N. I. HALL
BY William F. Simpson
ATTORNEY

Patented Jan. 22, 1952

2,582,959

UNITED STATES PATENT OFFICE 2,582,959

ELECTRON-TUBE CONTROLLED
SWITCHING SYSTEM

Edmond Bruce, Red Bank, and Nathan I. Hall, Madison, N. J., assignors to Bell Telephone Laboratories, Incorporated, New York, N. Y., a corporation of New York Application October 29, 1947, Serial No. 782,704

22 Claims. (Cl. 179—22)

This invention relates to a communication system and more particularly to an automatic switching system wherein subscribers are automatically connected together under control of signals transmitted from calling subscribers' stations to a central switching station.

An object of the present invention is to improve the efficiency and speed of operation of switching systems and the apparatus and circuits thereof, as well as improve and simplify their methods of operation and cooperation by minimizing the use of common control equipment.

A feature of this invention relates to the use of gas discharge tubes having a main discharge gap and one or more control gaps to control switches and circuits.

Another feature of this invention relates to methods and circuits for marking all idle paths between any two desired points in a multistage switching system and then employing a gaseous discharge path electron tube lock-out arrangement for selecting one of the idle paths.

Another feature of this invention relates to methods and equipment for equalizing the load or calls through various switches by providing preference for tubes or groups of tubes associated with the switches and circuits which are less heavily loaded.

Another feature of this invention relates to circuits and apparatus for delaying the application of discharge initiating potential to certain starting electrodes whereby the discharge is initiated through the corresponding tubes only if a discharge is not initiated through other tubes to which the application of the discharge initiating potential is not delayed.

Another feature of this invention relates to circuits and apparatus for delaying the application of discharge initiating conditions to the electrodes of certain tubes by progressively greater intervals as the number of busy circuits increases.

Another feature of this invention is directed to the alternate use of different groups of common equipment, first, to more uniformly distribute the traffic load throughout the system, and second, to provide alternate equipment so that the subscriber will not get the same equipment on two successive attempts to initiate a call.

Another feature of this invention relates to the use of the same switches and common control circuits for initiating and terminating calls.

Another feature of this invention relates to the provision of circuits and apparatus for giving preference for the use of the common equipment for the termination of calls.

Another feature of this invention relates to completing a terminating call by simulating a calling condition in the subscriber's line equipment and then completing a connection through the switching equipment in a manner similar to the manner in which connections are completed through the switching equipment in response to calls originated by subscribers.

Another feature of the invention relates to preventing the origination of calls during the time a call is being completed to a called subscriber's line and during completion of the call to the desired transmission circuit preventing completion of other calls to all other similar circuits.

Another feature and object of this invention relates to providing new methods of control of switching equipment which so efficiently uses the switching equipment and apparatus at sufficiently high speeds that only one communication path through the system need be established at any instant of time. After the path is established, of course, it may be maintained indefinitely under the control of the subscribers while the switching equipment will be free to establish other connections between other subscribers. In every case, however, the efficiency of operation and the speed of establishing connections are both sufficiently high that the establishment of calls or connections need be made one at a time through the switching equipment.

Another feature of this invention relates to improve circuits and apparatus and methods of operating the same to indicate all the idle circuits employed in handling of a call and to provide simple lock-out arrangements for selecting one of each of the available circuits.

Another feature of this invention relates to a common release and preference circuit for restoring the controlling circuits and tubes of the switching equipment to their normal or idle condition after each communication path has been established so that they will be free to establish another communication path between other subscribers independently of the continued establishment of the first path.

Another feature of this invention relates to a common time-out circuit for restoring the controlling circuits and tubes of the switching equipment to their normal or idle condition if a communication path is not established through the equipment within a given time and to advance the preference circuit so that if an attempt is again made to establish a path through the switches for the same call some different path will be given preference.

Another feature of this invention relates to circuits, apparatus and methods of increasing the tube life by reducing the current through the tube as soon as possible or extinguishing the discharge through the tube as soon as the discharge has performed its function and is no longer required or by both reducing the current and then extinguishing the discharge through the tube.

Other features of this invention relate to improved arrangements for supplying supervisory signals including dial tone, busy tone, ringing current and disconnect signals.

Briefly, in accordance with the exemplary embodiment of this invention, a plurality of gaseous conduction tubes are employed in combination with switches of the cross bar or coordinate type. These switches are arranged in primary and secondary groups with the subscribers' lines attached to the vertical elements of the primary switches and local trunk or transmission circuits connected to the horizontal elements of the secondary line switches. A portion of the trunks of the horizontal elements of the secondary line switches are used for originating calls and these trunks extend to circuits commonly called junctors. The other trunk circuits connected to the horizontal elements of the secondary line switches are employed for terminating calls and may come from other switches, junctors, trunks, or line circuits.

The horizontal elements of the primary switches are connected to the vertical elements of the secondary line switches within each primary-secondary switch group. One manner of arranging these primary-secondary switch groups is to provide ten primary switches or switch groups and ten secondary switches in a group. Such a group may be employed to handle the traffic for one to two hundred subscribers' lines. A register connector switch is employed to connect registers to the junctors for the purpose of receiving dial pulses from the subscriber. A release and sequence control circuit is employed to control certain switching functions.

In the exemplary embodiment described herein, a line tube is provided for each subscriber's line. When the subscriber initiates a call, a discharge is initiated through the control gap of a subscriber's tube. The initiating of a discharge across the control gap of a subscriber's line tube sets into operation the release and sequence circuits, as well as other circuits, for applying suitable potentials to control leads which extend through the registers, junctors and break contacts of the vertical or hold magnets of the secondary line switches and then to primary selector tubes, one of which is associated with each horizontal element of the primary cross bar switches. The above-described lead extends through only idle registers, junctors and through the break contacts of only unoperated hold magnets of the secondary line switches. This potential is employed to thus mark all available paths from the calling subscriber's line to all of the idle registers and junctors.

The primary select tubes mentioned above are arranged in a lock-out circuit so that only one of these tubes may fully operate at a time. Additional gaseous discharge tubes are associated with each of the junctor circuits and are similarly arranged in a lock-out circuit so that only one of these tubes may operate at a time. Similar tubes arranged in a similar manner are associated with the trunks extending to the register circuits.

The release and preference control circuit, in addition to supplying suitable potentials to the control element of the subscriber's line tubes as described above, also supplies potentials to tubes individual to the junctors and registers so that a tube associated with one junctor, and another tube associated with one register, become fully energized. The energization of the primary select tubes and the tubes individual to one junctor and to one register completely select a path through the primary and secondary line switches and the register connector, which is also a cross bar switch in the exemplary embodiment set forth in detail herein.

The operating circuits for the various select magnets in the cross bar switch are arranged in control circuits such that upon the determination of the path through the system the magnets will be operated in the proper order to establish the selected path. For example, each of the secondary cross bar switches is provided with a start relay which is actuated every time a primary select tube associated with a primary horizontal level which extends to the given secondary switch has a discharge initiated therethrough. The operation of this start relay together with the operation of the proper select magnet of the secondary switch and the initiation of the discharge through the primary switch tube causes the energization of the associated select magnets on the primary and secondary cross bar switches. The energization of the primary cross bar switch select magnet then completes a circuit for the operation of the primary hold magnet associated with the calling subscriber's line and the hold magnet of the secondary cross bar switch associated with the selected level of the primary cross bar switch. Upon the energization of these two hold magnets, the subscriber's line circuit is extended to the selected junctor circuit and a path completed for the operation of the register connector switch to connect the selected register to the subscriber's line and selected junctor circuit.

Upon the establishment of a connection from the subscriber's line to the register circuit the release and preference circuit causes all the energized tubes to release and restore the control circuits to their normal position so that they will be able to establish other circuits through the switches. Thus the discharges through the tubes are extinguished as soon as they have functioned to set up the path. By thus operating the tubes during the time required to establish the paths only, the life of the tubes is increased to be substantially equal to the life of the rest of the equipment.

However, the previously established connection from a subscriber's line to a register will not be released at this time due to the operation of the release and preference circuit. This connection will be maintained through the switches under control of the calling subscriber. The operation of the preference circuit at this time also changes connections to the junctors and registers so that upon the initiation of the next call a different group of registers and junctors will be given preference in the establishment of a call from the subscriber's line to a junctor and register of the respective groups.

Upon establishment of a connection from a calling subscriber's line through the primary and secondary line switches to a junctor and from the junctor to a register, dial tone will be supplied to the calling subscriber over the connection established through the switches. The subscriber will then dial the number of the desired called subscriber station which dial pulses will be transmitted to and recorded by the register connected to the subscriber station.

In the exemplary embodiment described herein, the system is arranged so that it requires three digits to properly identify the called subscriber station. It is to be understood, however, that any suitable number of digits may be required and registered by the register to properly identify the called subscriber number.

Upon the completion of the dialing of the called subscriber's number, the register circuit is arranged to operate in combination with the release and preference circuit to initiate a discharge through the tube associated with the called subscriber's line. However, it is first necessary to wait until any connection in the process of being established from another calling subscriber's line to another register is fully established. In addition, before an attempt is made to initiate a discharge through the called subscriber's line tube, the release circuit is again operated to insure that no discharge has been initiated or exists in any of the subscriber's line tubes or in any of the other tubes employed in establishing connections from calling subscriber's stations to register circuits. In addition, in order to prevent two registers from attempting to simultaneously operate the same or different subscriber's line tube in response to numbers recorded in the registers, a lock-out tube per register is provided and arranged so that only one register may cause one subscriber's line tube to have a discharge initiated in it at a given time.

The operation of the called subscriber's line tube by the register causes the circuits to function subsequently in a manner similar to the manner in which they function when the subscriber's line tube has a discharge initiated through it in response to a subscriber initiating the call. Thus the operation of the register circuit at this time prevents the initiation of calls and simulates a condition in which the called subscriber's line equipment is thus actuated as if the called subscriber was the only subscriber applying a calling condition to the switching equipment.

The register then, upon initiating a discharge through the desired called subscriber's line tube is ready to initiate the establishment of a connection from the junctor, to which the register is connected, to the called subscriber's line. In order to establish this connection a tertiary group of cross bar switches is provided. The horizontal elements of these switches are connected to the outgoing trunk from the respective junctors while the vertical elements of the tertiary switches are connected to the horizontal elements of the secondary line switches employed in the establishment of connections to the called subscriber's line.

Incident to the operation of the register in initiating a discharge through the called subscriber's line tube, the register also causes the select or horizontal magnet of the horizontal element of the tertiary switch connected to the junctor in question to be operated. The operation of this select magnet in turn supplies potential to through relays and circuits including the back contacts of all the idle hold magnets of the tertiary and secondary line switches capable of establishing paths from the called subscriber's line to the junctor connected to the calling subscriber's line. This potential is applied to the primary select tubes of the primary line switches which may be employed in establishing the desired connection. The primary select tubes are arranged in a lock-out circuit as described above so that a discharge will be initiated in only one of these tubes. Upon the initiation of this discharge, the path from the junctor to the called subscriber's line is fully determined whereupon the proper magnets will be operated and establish a connection to the subscriber's line. Upon the establishment of this connection the release and preference circuit is again operated to promptly extinguish discharges through the tubes and thus increase the life of the tubes and so that the switch circuits may be employed in the establishment of other connections through the switches. As before, the established connections are not disturbed by the operation of the release and preference circuits. Instead, the connections are maintained under the control of the subscribers.

Upon the establishment of the connection to the called subscriber's line, ringing current is applied from the junctor circuit and when the subscriber answers, talking battery is transmitted to the subscribers from the junctor circuit. The junctor circuit also controls supervision at this time and maintains the connection between the subscribers' lines under control of the subscribers. At the completion of a call, the connection is interrupted and the circuits restored to normal when the subscribers hang up.

In addition to the above-described functions of the release and preference circuit, a time-out feature is also included which allows only certain times for connections through the switching equipment to be established. If the connections are not established within this time the release and preference circuit is operated so that upon the failure to connect the calling subscriber to a register circuit, a second attempt will be made but this time to a different junctor and register due to the operation of the preference circuit as described above. If a connection is not made from a register through the junctor to the called subscriber within a specified time the operation of the release circuits dismisses the register and causes busy tone to be transmitted to the calling subscriber whereupon the calling subscriber will hang up so the circuits through the switches described above will be restored to their idle condition. This time-out feature also protects the life of the tubes by extinguishing discharges through most of the tubes under exceptional or trouble conditions.

Provision is also made to arrange the marking of the circuits described above so that the traffic load through the various groups of switches within a primary-secondary switch group will be equalized. This is accomplished by delaying the application of potential through the more busy secondary switch groups so that discharges will be initiated through a primary select tube associated with an idle path through lightly loaded switch groups.

The foregoing and other objects and features of this invention, the novel features of which are set forth in the claims appended hereto, may be more readily understood from the following description when read with reference to the attached drawing in which:

Fig. 2 shows the method in which Figs. 3 to 18 are arranged adjacent to one another; and Figs. 3 to 18, when arranged as shown in Fig. 2, show the details of the various circuits and the manner in which they are interconnected to provide an exemplary system embodying this invention.

General description

Figure 1:
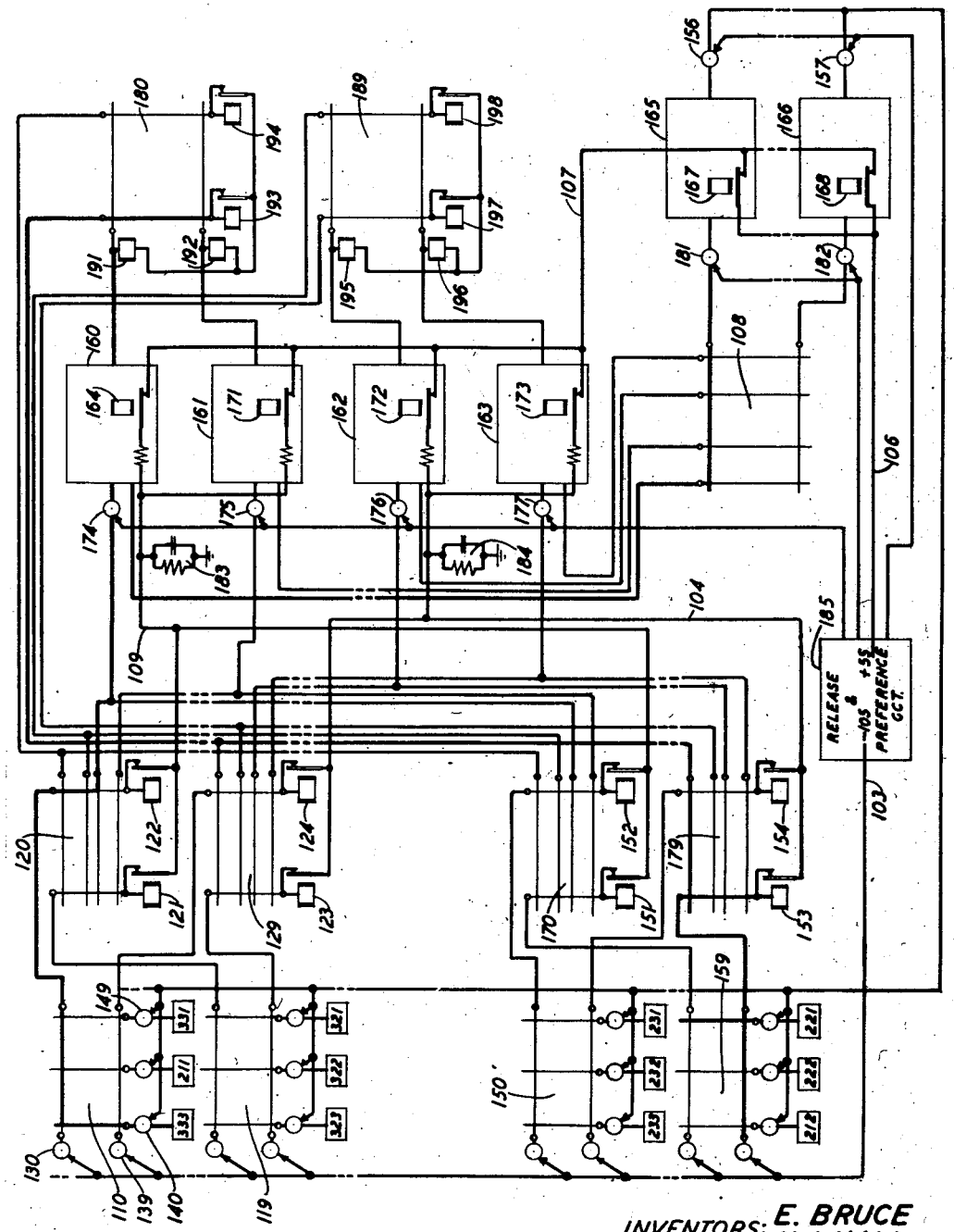
Fig. 1 shows in schematic form the various circuits and their manner of cooperation in the exemplary system described herein.

Fig. 1 of the drawing shows, in outline form, the various elements of an exemplary system embodying the invention and the manner in which these elements cooperate with one another to provide an automatic switching system operative to automatically interconnect the subscriber's lines connected thereto.

The switching system employs cross bar switches or other forms of coordinate switches. Details of a specific type or form of cross bar switch mechanism suitable for use in the exemplary embodiment set forth herein is described in detail in United States Patent 2,021,329 granted to Reynolds on November 19, 1935.

These cross bar switches are arranged in groups in a common manner to form a primary and secondary switch group. In Fig. 1, two groups of primary and secondary switches are shown. It is to be understood, however, that any suitable number of groups of primary and secondary switches may be employed in order to properly handle the traffic. As shown in Fig. 1, switches 110 and 119 represent the switches in the first and last horizontal level of one group of primary cross bar switches. So many primary switches may be connected in each horizontal level as may be desired. Associated with this group of primary switches, two secondary switches designated 120 and 129 represent the first and last switches of a group of secondary cross bar switches. These two groups of switches comprise one primary-secondary switch group. The paths from the primary switches to the secondary switches are sometimes called "line links."

The line links which interconnect the primary line switches and the secondary line switches appear in the horizontal rows of contacts in the switches of the different primary horizontal groups. There are ten of these links for each horizontal group.

In the exemplary embodiment described herein, ten secondary switches are provided on the line switch frame for each primary-secondary group of switches, there being one of these secondary switches for each horizontal group of primary switches. The primary and secondary switches are interconnected by the line links in such a manner that all ten primary groups have access to all ten secondary switches. This is accomplished by extending the ten line links from each horizontal group of primary switches respectively to the ten secondary switches. Stated in another way, each secondary switch receives a single link from each of the ten primary horizontal groups.

A second primary-secondary switch group comprises the primary line switches 150 and 159 and secondary switches 170 to 179. While only four switches are shown in each group it is to be understood that any suitable number, which is usually ten horizontal groups of primary switches and ten secondary switches, are associated together in the manner shown to form a primary-secondary switch group.

The subscribers' lines are associated with and individual to the vertical element of the primary cross bar switches as shown in Fig. 1. Subscribers' line stations and line circuits 333, 211, 331, 323, 322, 321, 233, 232, 231, 212, 222, and 221 are shown. It is to be understood, of course, that additional subscribers' lines may be associated with the switches actually shown in Fig. 1 and that other subscribers' lines will be associated with other primary switches not shown in Fig. 1. The horizontal elements of the primary line switches have associated with them a controlling electric discharge tube and are connected to the vertical of the various secondary line switches of the associated group elements or arrays of contacts. The horizontal elements of the secondary line switches are divided into two groups, one group providing means for terminating calls, that is, means for establishing connections to a called subscriber station and the other group being employed for originating calls, that is, for providing connections between calling subscriber lines and other circuits. The horizontal elements in this last group have individually associated with them circuits usually called "junctors" which are employed in the establishment of a connection from one subscriber station to another. Four junctors 160, 161, 162, and 163 are shown in Fig. 1. It is to be understood, however, that any suitable number of junctor circuits necessary to properly and adequately furnish the desired service may be employed.

As shown in Fig. 1, the junctor circuits are arranged into two groups, junctors 160 and 161 forming one group and junctors 162 and 163 forming the second group. While two groups of junctors may be satisfactory in many cases, it is to be understood that any suitable number of groups of junctor circuits, each group of which may comprise any suitable number of junctor circuits, may be provided. In addition, a group of cross bar switches 108 is employed to connect the junctor circuits with register circuits 165 and 166. The register circuits 165 and 166 record dial pulses and control the selection of the line to the called party. Circuits of this type are sometimes called "sender" circuits, although sender circuits are usually more complicated and complex than the register circuits 165 and 166.

Another group of cross bar switches is employed in the establishing of connections to called lines. These switches are sometimes called "tertiary" switches and are illustrated by the two switches 180 and 189 of Fig. 1. The horizontal elements of these switches are connected to the junctor circuits and the vertical elements are connected to the horizontal elements of the secondary line switches employed in establishing terminating connections to called subscribers' lines. In addition, a release and preference circuit is employed to control the switching circuits and is illustrated by 185 of Fig. 1.

A subscriber's line tube, such as 140, 149, etc., shown in Fig. 1, is provided for each subscriber's line and a group of primary select tubes 130, 139 is employed to control the cross bar switches. Furthermore, a group of similar tubes 174, 175, 176 and 177 is employed to select the junctor circuits. The register tubes 181, 182, 156 and 157 are likewise used to control the establishment of connections to or by the register circuits 165 and 166.

As is usually understood by persons skilled in the art, cross bar switches are all provided with horizontal and vertical magnets sometimes called "select" and "hold" magnets. Only certain of these magnets associated with the respective switches are shown in Fig. 1. It is to be understood, of course, that such magnets are employed to control all of the elements of the cross bar switches in a well-understood manner as described in the above-identified patent to Reynolds which is hereby made a part of the present application as if fully included herein.

Assume, for example, that the subscriber 333 wishes to communicate with subscriber 221. The subscriber 333 is provided with the usual type of subscriber's dial equipment station. The subscriber will, therefore, lift the receiver or remove the handset from the cradle which operates contacts in the subset and causes a discharge to be initiated through the line tube 140. The initiation of the discharge through tube 140 sets the release and preferance circuit 185 and other circuits into operation. Circuit 185 in combination with certain other circuits causes negative 48 volts to be applied to leads 103 which extend to the various primary select tubes 130 to 139 and also applies positive 55 volts to lead 106. Lead 106 extends through the respective break contacts of relays 167 and 168 of the registers of 165 and 166. It also extends in a similar manner through any additional register that may be provided. A circuit is completed from lead 106 to 107 through the back contacts of all of the register circuits which are idle at that time. Lead 107 then extends in parallel through the back or break contacts of relays 164, 171, 172 and 173 of the respective junctor circuits 160, 161, 162 and 163. A connection is established from lead 107 to lead 109 associated with the first group of junctor circuits through each of the individual junctor circuits of the first group which are idle at that time. This connection is established from the back contacts of respective relays 164 and 171 and similar relays of other junctors included in the first group of junctor circuits. A second connection is established from lead 107 to lead 104 through the junctors of the second group 162 and 163 which are idle when the subscriber 333 originates a call. Lead 109 extends to the break contacts of the holding magnets of all of the secondary cross bar switches having trunks extending to and assigned to the first group of junctor circuits 160 and 161. Lead 104 likewise extends to break contacts of the holding magnets of all of the secondary line switches which have trunks extending to and assigned to the second group of junctor circuits 162 and 163. A circuit is thus established from the respective leads 104 and 109 through the break contacts of the holding magnets associated with the idle vertical contact groups of the secondary switches to the connected primary select tubes such as 130 and 139. In this manner all the idle paths extending from junctor circuits are marked as being ready and available for establishing a connection from the subscriber's line to an idle register.

It should be noted that in case all of the registers are busy, all of the relays similar to relays 167 and 168 will be operated. Consequently no connection will be established from the positive 55-volt tap or lead of the release and preference circuit 185 to the primary select tubes and as a result no idle path will be marked through the cross bar switches. Likewise, if all of the junctors are also busy at this time, all of the relays 164, 171, 172 and 173, and corresponding relays of the other junctor circuits not shown, will be operated and as a result no connections will be extended from conductor 107 to conductors 108 and 109.

Assume for the purpose of illustration that all of the registers and all of the junctors are not busy so that a path extends from the positive 55 volts to the anodes of the select tubes for establishing a path to any one of the idle junctors and recorders. The application of this potential to the anodes of the primary select tubes as well as the application of the negative 48 volts to the cathodes in these tubes initiates a discharge through a select tube. The select tubes are connected in a lock-out circuit arrangement such that only one of the select tubes can become fully energized; even though control discharges may be simultaneously initiated through more than one tube, only one tube will have its main discharge path rendered conducting. Upon the initiation of a discharge through one of the select tubes 130 to 139 the path through the switching system is in part chosen.

The release and preference circuit, in addition to causing potentials as described above to be applied to the various leads, also applies potentials to the tubes 174, 175, 176 and 177, which tubes are likewise connected in lock-out circuits so that only one of them may be fully operated. The tube that becomes completely energized selects the junctor to be connected to the originating subscriber's line. In a similar manner tubes 181 and 182 are controlled from the release and preference circuit 185 and operate to select one of the register circuits to receive the pulses dialed by the originating subscriber.

Upon the initiation of the discharge through the respective tubes as described above, the path from the calling subscriber station to the selected junctor and register is fully selected. Thereafter the various magnets are operated in the proper sequence to extend the connection from the subscriber's line circuit to the register circuits. Assume that tube 130 becomes conducting upon the application of the negative 48 volts and positive 55 volts as described and also assume that tubes 174 and 181 become conducting thus selecting junctor 160 and register 165 for operation in response to the call placed by the subscriber's station 333.

As a consequence of initiation of the discharge through primary select tube 130, a start relay associated with each of the secondary line switches is operated when the discharge is initiated through any primary select tube associated with the path extending to the secondary line switch. Thus the start relay associated with the secondary switch 120 is operated every time a discharge is initiated through tubes 130, 139 and all other primary select tubes associated with horizontal levels of the primary cross bar switches which extend to the secondary switch 120. The other secondary cross bar switches are provided with similar start relays which are actuated upon initiation of a discharge through a primary select tube associated path extending to the respective secondary cross bar switches.

The operation of the secondary start relay together with the initiation of the discharge through tube 174 causes the select magnet of the secondary line switch 120 associated with the path to junctor 160 to be operated.

The initiation of the discharge through tube 139 likewise causes the select magnet associated with this tube to be operated. The operation of this select magnet then causes the vertical magnet of the primary switch associated with the subscriber's line 333 to be operated as well as the fold magnet 122 of the secondary switch 120. The operation of these two hold magnets at the time when the above-described select magnets are operated as described above extends the subscriber's line circuit to the junctor circuit 160. Assuming that tube 181 has a discharge initiated across the main discharge path of this tube then register circuit 165 will be selected and then the controlling magnets of the cross-bar switch 108 will be operated in response thereto to establish a connection from the junctor circuit 160 to the register circuit 165 which connection also extends to the calling subscriber's line through junctor circuit 160.

As shown in Fig. 1, a connection extends from conductor 104 to primary select tube 139 and a similar connection extends from conductor 109 to the primary select tube 130. Other connections extend from these leads to sets of the primary select tubes associated with the primary cross bar switch 110. It should be noted that network 183 comprising a resistor and condenser is connected to lead 109 and that a similar network 184 is connected to the lead 104. Upon the application of the positive 55 volts to conductor 106 the condensers associated with these two networks start to charge through the high resistances in the junctor circuits 160, 161, 162 and 163. It is evident that if all the junctor circuits are idle so that all of the relays 164, 171, 172 and 173 are released, the condensers associated with the networks 183 and 184 will both charge at substantially the same rate so that the potentials applied to the control anodes of the primary select tubes such as 130 through 139 will all be substantially the same and the respective tubes will all have an equal opportunity to have a discharge initiated through them under control of the lock-out circuit and the characteristics of the tubes. However, assume that one of the junctors, say 162, of the second group is busy. Under these conditions the charging resistance for the condenser of network 184 will be twice as great as the charging resistance of the condenser 183. Consequently condenser 184 will charge at a slower rate so that potential will be applied to the control anode of the primary select tubes connected to lead 104, such as tube 139, at a slower rate so that the potential across the control gap of this tube will reach the discharge initiating or firing potential later than the corresponding potential applied to the primary select tubes having their control anodes connected to lead 102 such as tube 130, with the result that tube 130, for example, will fire first and thus have preference. If one of the junctors of group 1 had been busy instead of one of the junctors in group 2 as assumed above then tube 139, for example, would have been given preference, provided of course, the secondary cross bar vertical group controlled by the vertical magnet 124 is not busy. If it is assumed that this magnet and associated vertical group of contacts is engaged in providing another connection through the switching system, then even though there are fewer junctors in the second group idle than in the first group, still the discharge will be initiated through tube 130.

In addition, if there is a larger number of circuits in each of the groups, the amount of delay is progressively increased by greater increments as more and more circuits become busy because the change in charging resistance becomes greater as more resistances are removed from the parallel charging circuits through the idle junctor circuits. This may be readily understood by assuming that ten circuits are idle, and then one becomes busy. The change in combined charging resistance due to removal of one resistance is approximately 10 per cent. If, on the other hand, only four of the paths are idle and one of them becomes busy, the change in charging resistance is substantially 25 per cent instead of 10 per cent. Such a non-linear and progressively increasing delay as the load upon the office increases is advantageous because the greater load on the system, the more uniformly distributed the traffic through the switching system becomes. When the system is lightly loaded, the distribution and uniform loading of the circuits and switches is of relatively little concern and consequence. However, when the system is busy and heavily loaded, it is highly desirable that the load should be uniformly distributed so that the maximum number of calls may be handled by each of the given switches and switching circuits. It is thus most desirable to insure that as the load increases on the system the distribution of the calls throughout the switches becomes more uniform. Such an arrangement is insured by making the delay progressively greater as the load increases, and thus rendering the uniform distribution of the calls throughout the circuit more certain.

Thus the networks 183 and 184 connected to the leads 109 and 108, respectively, equalize and more uniformly distribute the calls between secondary cross bar switches. In this manner the efficiency of the system is increased because the chances of finding all the paths busy between any of the subscribers' lines remain substantially the same so long as the load is substantially equally distributed over the switches of the office.

It should also be noted that due to the resistances in the junctor circuit and the resistance of network 184, the potential applied to the control anodes of the primary select tubes which are associated with the group of junctors having the most busy circuits is somewhat less than the potential applied to the control anodes of the primary select tubes associated with the group or groups of junctor circuits having fewer busy circuits. Thus in a second way, and for this additional reason, preference is given to the select tubes associated with the group of junctors handling the least number of calls at the time.

Upon the establishment of a switching path from the subscriber's station 333 to the junctor 160 and the register 164 under the above assumptions, release circuit 185 is actuated to extinguish all of the tubes employed in establishing this connection. By thus promptly extinguishing the discharges through the tubes sufficient current may be passed through the tubes to operate the necessary relays and control magnets and at the same time secure adequate life for the cold cathode tubes employed in the system. The extinguishing of these tubes does not interrupt the above-described connection from the subscriber's line to the junctor circuit. Upon the return of the release and preference circuit to normal the switching equipment is again conditioned to establish another connection from any calling subscriber to any other junctor and register circuit. Each operation of the release and preference circuit changes the preference of the groups of register circuits and the groups of the junctor circuits so that the same register circuit or the same junctor circuit will not be used on two successive calls unless it is the only one of the respective types of circuits that is available for use at that time.

Upon the establishment of a path from the subscriber station 333 to the junctor 160 and the register 165, dial tone will be supplied to the calling subscriber from the register 165 through the connection established through the cross bar switches. The subscriber will then dial the called station's number which we have assumed to be 221. Upon completion of dialing this number the register 165 will attempt to condition the switching equipment for establishing a connection to a called line and set the release and preference circuit 185 into operation. If this circuit is engaged in the establishment of another connection through the cross bar switches at this time register 165 must wait until this connection is completed. Upon the completion of the establishment of the connection through the cross bar switches and the operation of the release circuit 185 as described above register 165 will again set the release and preference circuit into operation and again operate the release portions of this circuit to extinguish all discharges through any of the tubes that may have been initiated upon the release of the release circuit. Thereafter the release circuit will apply potentials to tubes 156 and 157 and any other similar tubes similarly associated with other registers. These tubes are arranged in a lock-out circuit so that only one register circuit may establish a connection to a called station at a given time. Thus the preference circuit first excludes the establishment of connections through the cross bar switches from calling subscriber stations and then permits only one register to operate at a time. Assuming that tube 156 has had a discharge initiated through it and fully operated so that register 165 may cause a discharge to be initiated through the subscriber's line tube 221 under the assumed conditions. At substantially the same time the register circuit 165, by means of connections through the register connector switch 108, will cause the select magnet 191 of the tertiary cross bar switch 189 to be operated. In addition positive potential is applied through the break contacts of the idle or unoperated vertical magnets 193, 194, etc., of cross bar switch 180 and through the break contacts of the unoperated vertical magnets of the secondary line switches which may be employed in establishing a connection to the subscriber's line 221. Thus, for example, as shown in Fig. 1, a possible connection will include the elements associated with the vertical magnet 193 and all the vertical magnets of switch 179, namely 153, 154, etc. A possible path also extends through the vertical elements associated with the hold magnet 194 and switch 170 as well as vertical magnets 151, 152, etc.

The release and preference circuit 185 also applies operating potential to the control cathodes of primary select tubes of switch 159. These tubes are operated in a lock-out circuit arrangement so that only one of them may become fully conducting. Assuming that the last one of these tubes becomes conducting at this time, then the path to the subscriber's station circuit 221 is fully selected and the remaining magnets are operated to complete the connection from the junctor circuit 160 through the secondary switch 179 and primary switch 159 to the subscriber's circuit 221.

The release and preference circuit is then again set into operation and interrupts the discharge through all of the tubes employed for establishing the above-described connection. The interrupting of these discharges, however, does not interrupt or tear down the established connection which is maintained under control of the subscribers. The extinguishing of the various tubes employed in establishing the connection and the restoration of the release circuit restores the switching equipment to its previous condition so that it is available for establishing other paths through the cross bar switches.

Establishment of the connection between the junctor circuit 160 and the subscriber's station 221 releases the cross-points of switch 108 employed to establish a connection from the junctor 160 to register 165 so that this register will then be available for use in recording other numbers dialed from other subscribers' stations for the establishment of other connections through the switches.

The establishment of the connection from the junctor 160 to the subscriber's line 221 also conditions the junctor circuit 160 for applying ringing current through the established connection to the called subscriber's line 221. Upon the answering of the call by the subscriber at station 221, junctor circuit 160 supplies talking battery to both subscribers and maintains the connections established under control of the subscribers. Upon completion of the call the subscribers will hang up and cause the junctor circuit 160 to tear down the established connections through the cross bar switches and thus restore the circuits to their normal or unoperated condition.

The release and preference circuits are also provided with time-out features which operate at a predetermined interval of time after an attempt is made to establish a connection through the switches. If the connection is made within the predetermined time the time-out circuit is restored to normal. If the connection is not made within the predetermined time the time-out feature functions and initiates the operation of the release circuits which extinguish discharges through the tubes which have been initiated and changes the preference for the junctor circuits and the register circuits. Thus, if the time-out circuit functions on an incoming call it will cause the release circuit to function and at the end of this time will permit a second attempt to establish a connection from the calling subscriber's line to a junctor and register circuit but this time over a different path, due to the operation of the preference circuit.

If the switches fail to establish a connection from a junctor circuit to a called subscriber's line within the predetermined time, the time-out circuit functions at the end of this time so that the release circuit is set into operation which extinguishes the discharges through all of the tubes which may have discharges initiated in them and causes a busy tone to be returned to the calling subscriber's station so that the subscriber may hang up and later again initiate a call for the desired subscriber's station. The time-out feature also guards the life of the cold cathode tubes by preventing excessively long discharges through them under unusual or trouble conditions.

*Detailed description.—Subscriber initiates a call*

Figure 13:
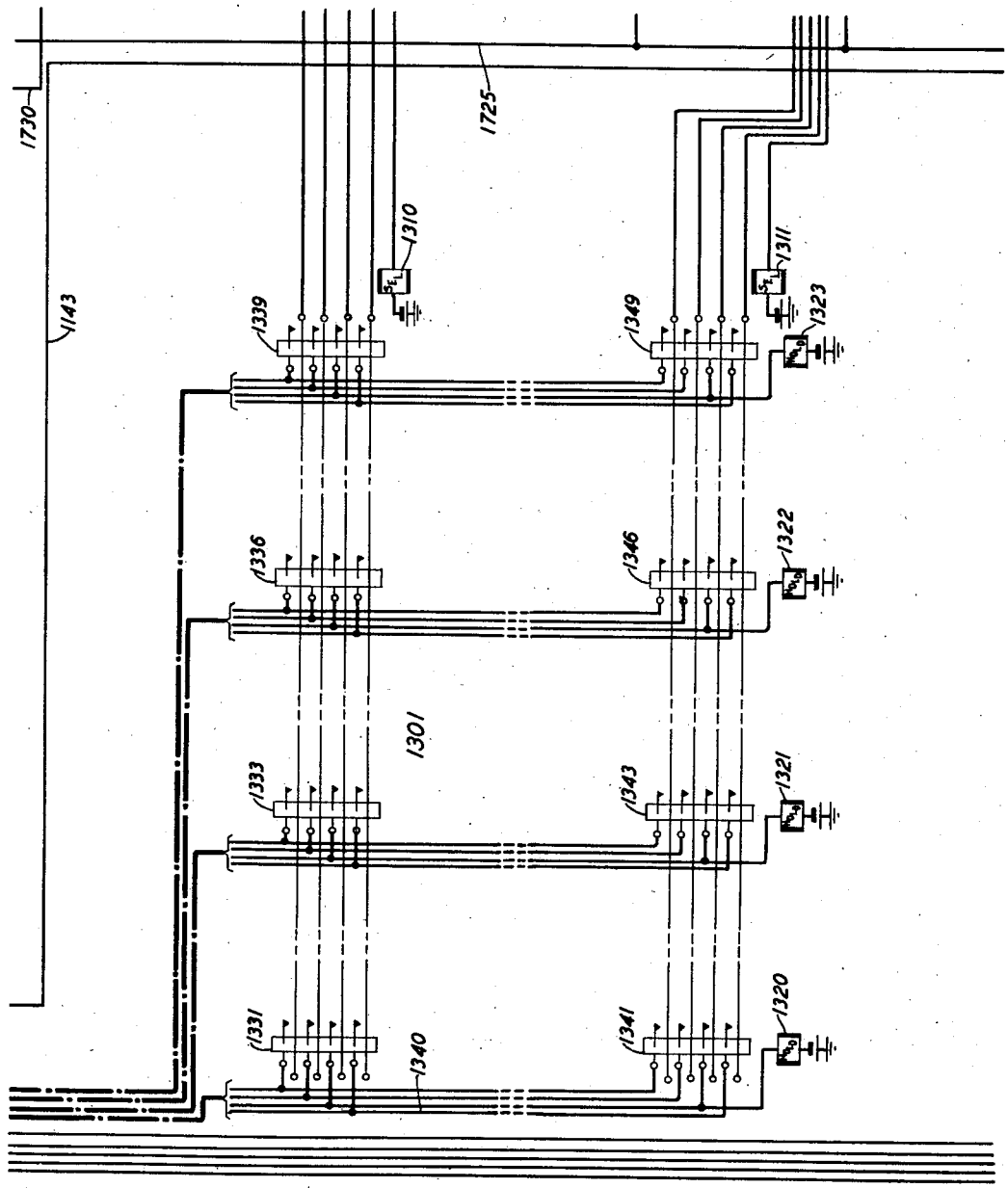
Figure 14:
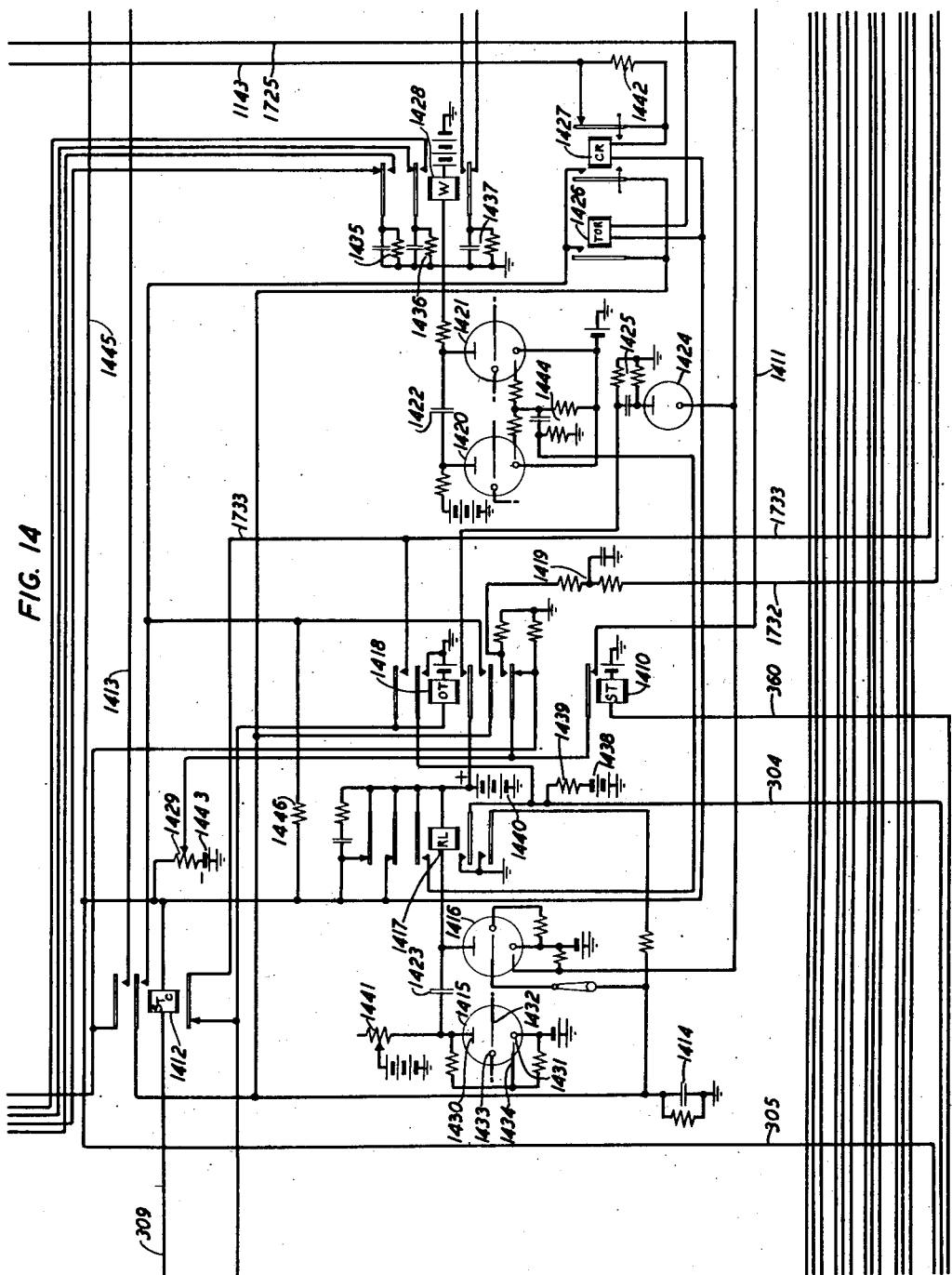
Figure 15:
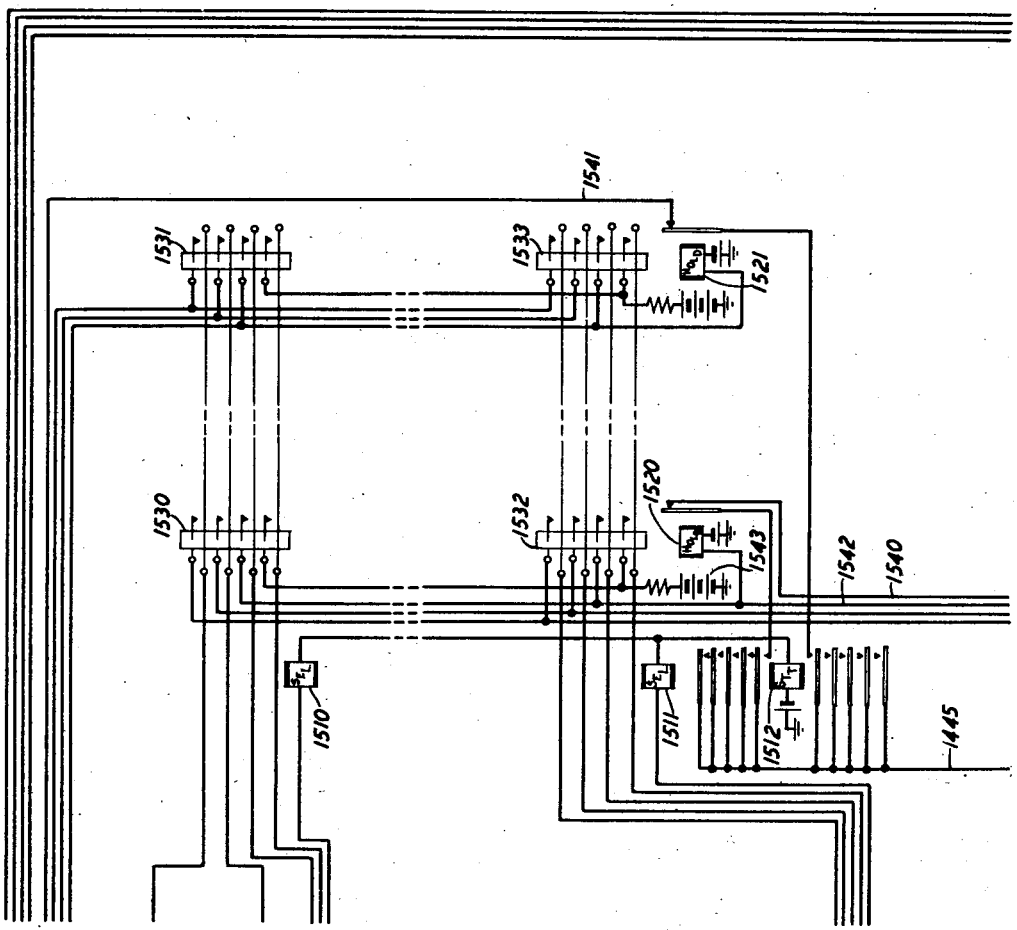
Figure 16:
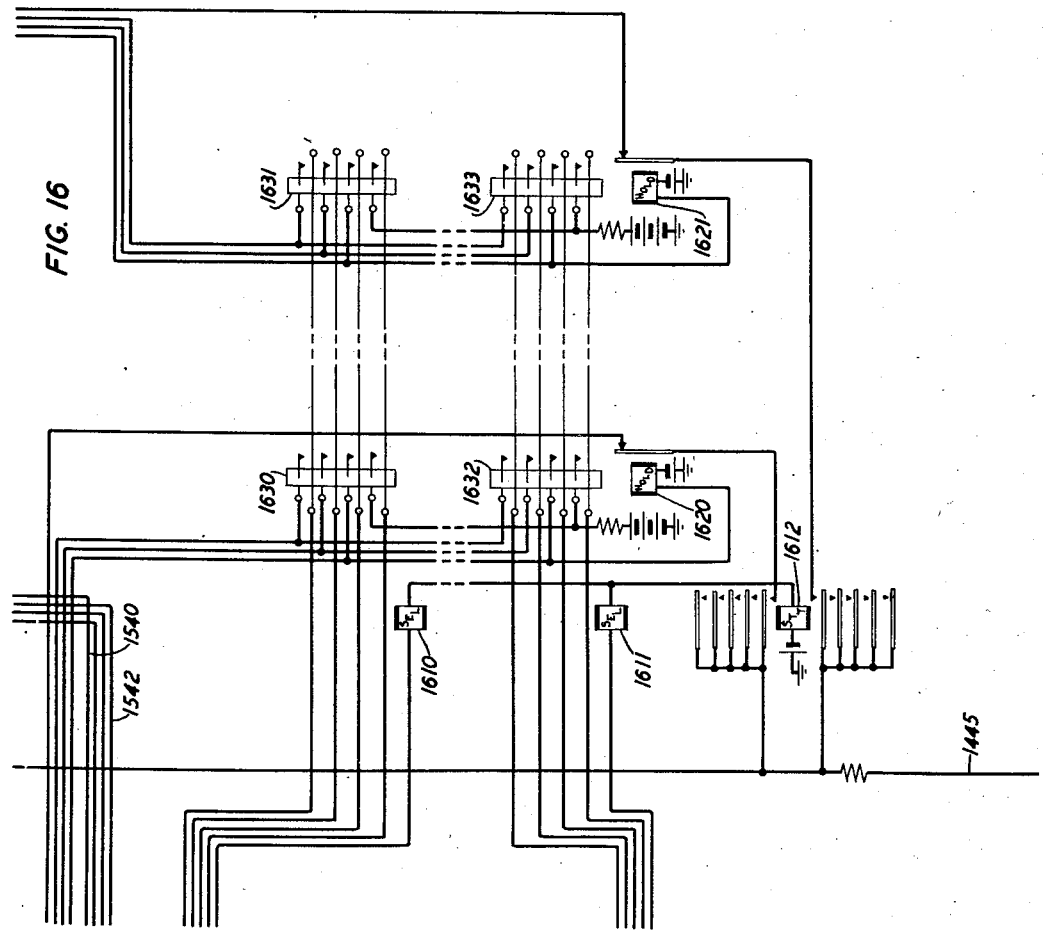
Figure 17:
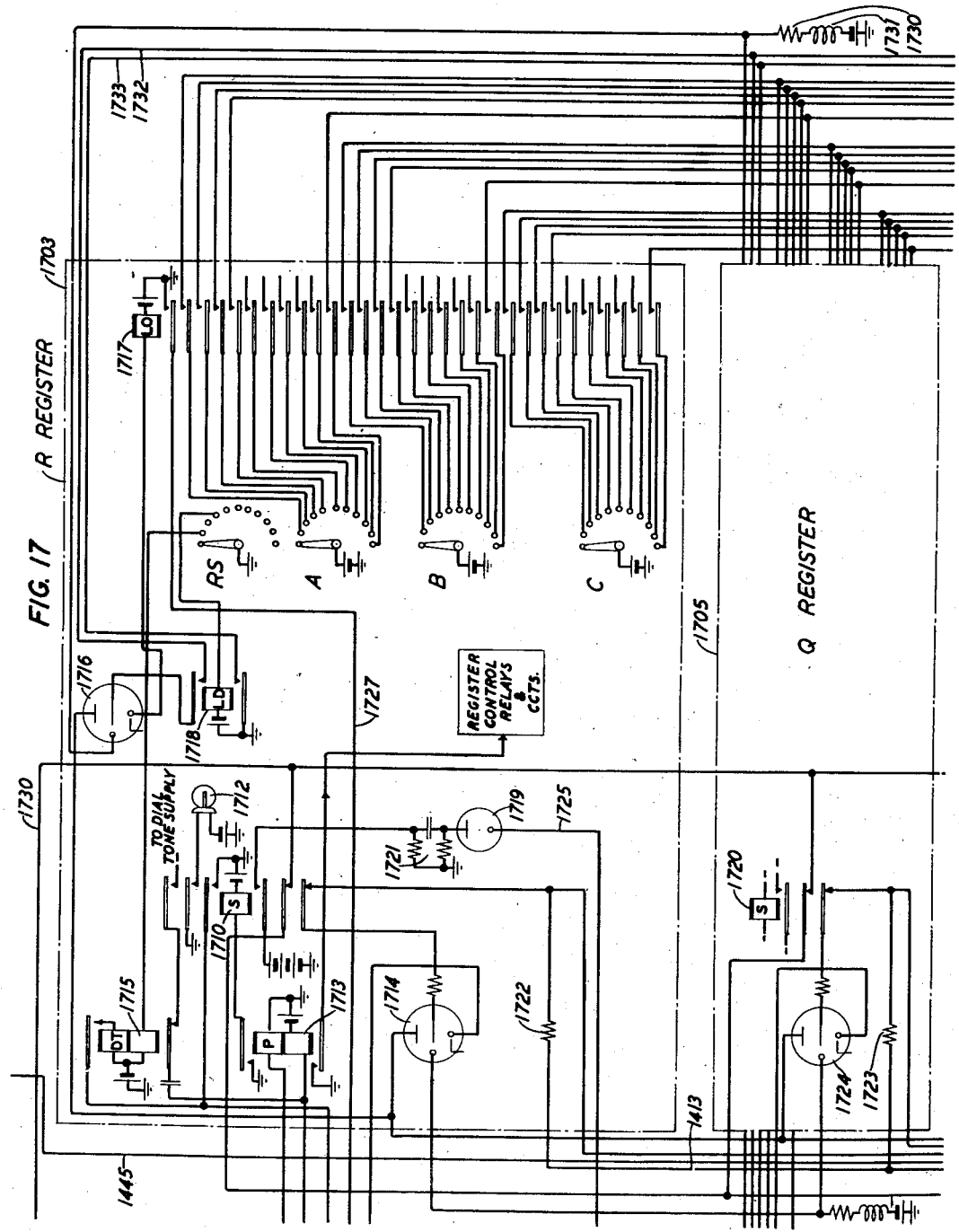
Figure 18:
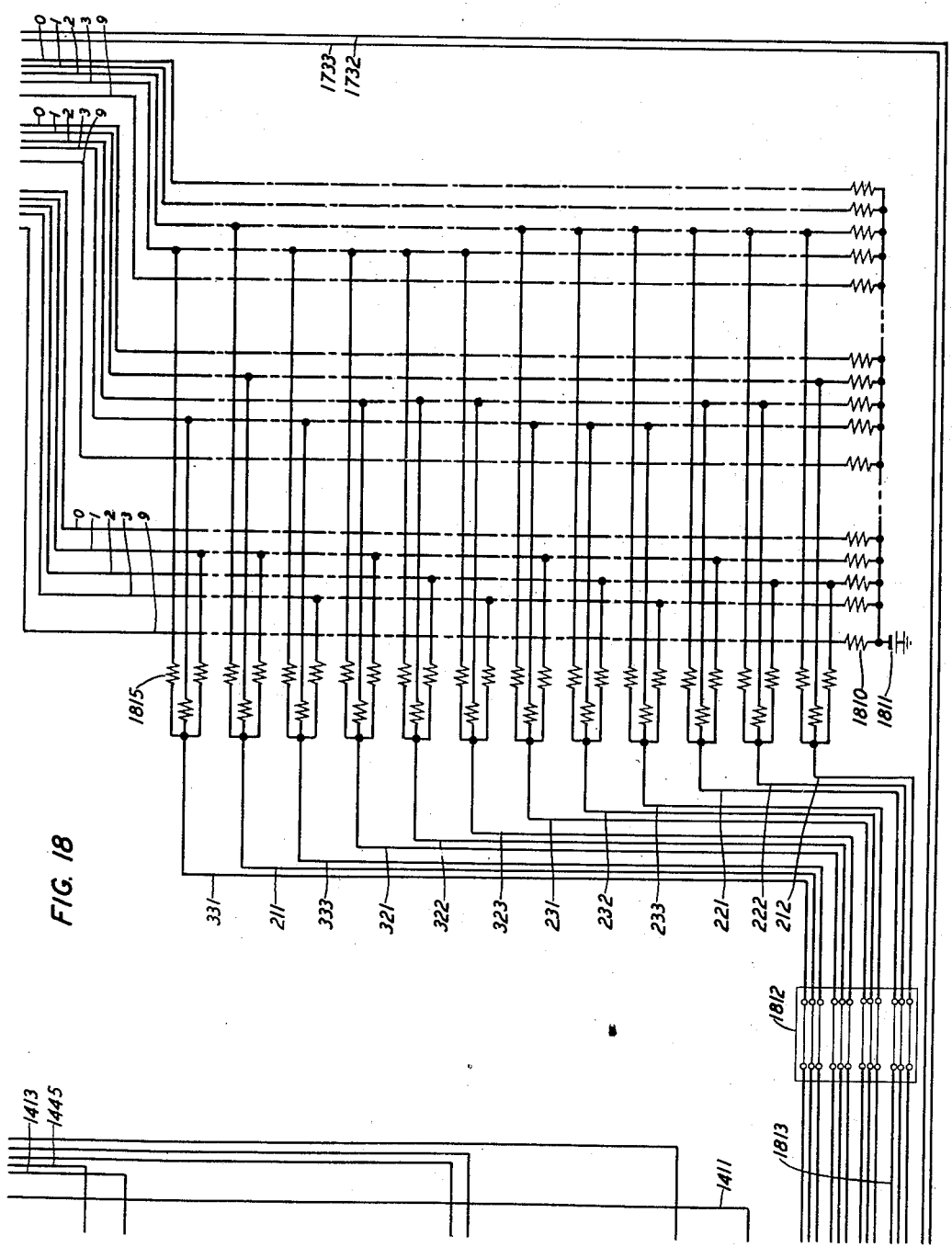

Referring now to Figs. 3 through 18 inclusive, when arranged as shown in Fig. 2, and assuming that power has been applied to the system and that the circuits are all in their normal or idle condition as shown on the drawing, Figs. 3 and 4 show two primary cross bar switches of one group of primary and secondary cross bar switches and Figs. 7 and 8 show two of the associated secondary switches of that group. Likewise Figs. 5 and 6 show two primary switches of a second primary-secondary group and Figs. 9 and 10 show two of the associated secondary switches of the second group of primary-secondary switches. Figs. 11 and 12 show two groups of junctor circuits, one group being shown in Fig. 11 and another group in Fig. 12. Figs. 15 and 16 show tertiary cross bar switches employed to connect the junctor circuits of the terminating portions of the secondary switches of the respective groups. Fig. 13 shows cross bar switches employed as the register connector for connecting the register circuits to the junctor circuits. Fig. 14 shows the release and preference circuit while Fig. 17 shows the register circuits and Fig. 18 shows the connections by means of which the registers select the desired subscriber's line circuit tube to initiate a discharge therethrough in the manner explained hereinafter.

Upon the application of power to the system a discharge will be initiated through tube 1415.

The tubes 1415, 1416, 1420 and 1421 are similar to the other tubes employed in the system and have similar operating characteristics. As shown in Figs. 3, 4, 5, 6, 11, 12, 14 and 17 tubes of this type are provided with three anodes and two cathodes. The tubes have all been shown in a similar manner so that the respective electrodes may be easily recognized. For example, in tube 1415, 1430 represents the main anode and 1431 represents the main cathode so that these two elements comprise the main discharge gap or path through the tube. Two auxiliary gaps or paths through the tube are also provided. The first control path or gap comprises the control anode 1432 and a control cathode 1433. A second control or auxiliary anode 1434 cooperates with the main cathode 1431 to provide a second control gap within the tube.

The tubes are designed to respond to the potentials supplied to them in such a manner that upon the initiation of a discharge across the control gap comprising the control anode 1432 and the control cathode 1433 a discharge will take place between the control cathode 1433 and the main anode 1430 as the first step in transferring the discharge from the control gap to the main discharge path through the tube. Thereafter the discharge will transfer to the path between the main anode 1430 and the main cathode 1431. If a discharge is prevented from taking place between the control cathode 1433 and the main anode 1430 no discharge will be initiated between the main cathode 1431 and the main anode 1430 even though a discharge is initiated between the control anode 1432 and the control cathode 1433. If, however, a discharge is initiated between the auxiliary anode 1434 and the main cathode 1431 a discharge is at once initiated or transferred to the main discharge path between anode 1430 and cathode 1431. The details of these tubes are more fully described in the copending application of W. A. Depp, Serial No. 13,283, filed March 5, 1948, now Patent No. 2,549,064, which application specifically points out and claims the feature of the above-described tubes disclosed herein which are novel.

As pointed out above Fig. 3 represents a cross bar switch. As shown in Fig. 3 six cross-points 351, 352, 353, 354, 355 and 356 are shown. Persons skilled in the art will readily recognize that numerous other horizontal and vertical rows of cross-points will be provided. In the usual case ten horizontal rows are provided and ten to twenty vertical rows.

For further details of the construction of the cross bar switches of a suitable type, reference is made to United States Patent 2,021,329 granted to J. N. Reynolds on November 19, 1935, the disclosure of which patent is hereby made a part of the present application as if fully included herein. The same type cross bar switch is suitable for use as the other cross bar switches shown herein in Figs. 4, 5, 6, 7, 8, 9, 10, 13, 15 and 16. In general these switches are provided with a group of magnets associated with the horizontal rows frequently called the horizontal or select magnets and another group of magnets associated with the vertical rows of contacts frequently called vertical magnets or hold magnets. In order to select and cause closure of contacts at any cross-point it is first necessary to operate the select magnet or horizontal magnet associated with the horizontal rows of contacts in which the selected set of cross-point contacts is located. Next, the vertical or hold magnet associated with the vertical row of contacts in which the desired set of contacts is located must be operated. Thereafter so long as the hold magnet is maintained operated the selected cross-point contacts are maintained closed. The select magnet may then be released without interfering with or opening the selected contacts.

Assume now for purposes of illustration that the subscriber at station 333, shown in Fig. 3, initiates a call and that he wishes to communicate with the subscriber's station 221 shown in Fig. 6. The subscriber at station 333 will, of course, pick up the receiver or handset which in turn actuates contacts at the subscriber's station to close the subscriber's line.

Normally the control cathodes of the subscriber's line tubes associated with the cross bar switch shown in Fig. 3 have negative 105 volts applied to them through the lock-out resistor 308 and lock-out inductor 306 and lead 304 which extends through Figs. 4, 5, 6 and 10 to the negative battery 1438 through resistor 1439. The control gap anode of the subscriber's line circuit tube is normally connected to negative 48-volt battery 361, for example, through resistors 362, 363 and 364. The anodes of the control gaps of the other subscriber's line tubes are similarly connected through corresponding resistors to negative 48-volt battery. The difference of these voltages is about 57 volts and is insufficient to initiate a discharge across the control gap of any of the subscriber's line tubes.

However, upon the initiation of a call by a subscriber the subscriber's line is short-circuited or closed at the subscriber's station. This shunts out the negative 48-volt battery 361 and resistor 362 with the result that the control anode of tube 340 has its potential changed to substantially ground potential so that the potential across the control gap is 90 volts or more which is sufficient to initiate a discharge through the control gap of this tube. It should be noted that the instant a discharge is initiated and current starts to flow across this gap a potential drop appears across the lock-out resistor 308 and the lock-out inductor 306 tending to lower the voltage across the control gap or elements of tube 340. The lock-out resistor 308 and inductor 306 are common to all control gap cathodes of the tubes associated with the other subscriber's line tubes connected to the cross bar switch shown in Fig. 3 so that the voltage across these lock-out impedance elements reduces the voltages available for initiating discharges through other control gaps of these other subscriber's line tubes.

The main cathode of tube 340 and of the other subscriber's line tube is connected to negative 48 volts through the hold magnet individual to the respective tubes and subscribers' lines. The main anodes of these tubes are connected in parallel to positive 130-volt battery 1440.

Upon the initiation of a discharge across the control gap of tube 340 and with above-described voltages applied to the various electrodes thereof a discharge is initiated between the control gap cathode and the main anode of this tube in a circuit from negative 105 volts from battery 1438, resistor 1439, lead 304, lock-out elements 306 and 308, control cathode of tube 340, main anode of tube 340, resistors 365 and 366, inductance 367, lead 305 which extends through Figs. 4, 5, 6 and 10 to the 130-volt positive battery 1440 through the upper break contacts of relay 1417. This battery supplies the main anode power for the main discharge gaps of numerous of the tubes employed in the system. Resistor 365 is of such a magnitude that only a small current will flow through it and the above-described circuit at this time.

It should be noted that the control gap cathodes of all of the subscriber line tubes associated with the switch shown in Fig. 3 are connected in parallel without any impedance individual to any of these cathodes and to the common lock-out impedances 306 and 308. It should likewise be noted that all of the main anodes of these tubes are similarly connected in parallel and to resistor 365 which is common to all of the main anodes of these tubes. In other words, neither the control gap cathodes nor the main gap anodes of any of these tubes has any individual impedance or resistance. Substantially all of the impedances of these circuits is common to all of the subscriber line tubes connected with the cross bar switch shown in Fig. 3. These common impedances decrease the potential difference between the control gap cathode and the main anode of all the tubes the instant any one tube starts to pass any current. This decrease in potential difference prevents a discharge across any other transfer gap from being initiated in any of the other subscribers' line tubes even though a second discharge may have been initiated between the control anode and control cathode of another tube. Thus the transfer of a discharge can take place in only one tube at a time, which at this time is assumed to be tube 340, and thereafter the discharge in tube 340 transfers to and flows from the main anode to the main cathode through the winding of the hold magnet 315 to negative 48 volts.

The tubes and lock-out circuits disclosed in United States Patent 2,350,888 granted June 6, 1944, to N. I. Hall operate in an analogous manner. The disclosure of the above-identified patent is hereby made a part of this application as if fully set forth herein.

The magnitude of the resistor 365 is sufficiently great to prevent sufficient current from flowing through the winding of the hold magnet 315 to operate this magnet. The constants of the circuit are so adjusted in an exemplary embodiment described herein that this current, however, is of sufficient magnitude to cause the potential of the control cathode of the start tube 311 to be reduced to a sufficiently low value to create a discharge through the start tube 311 associated with and individual to the cross bar switch shown in Fig. 3.

The control gap anode of tube 311 is connected to the lead 305 which extends to the main positive 130-volt battery so that discharge is initiated between the control anode and the main cathode as soon as a discharge starts across the control gap. Such a discharge is not possible in the subscriber line tubes as pointed out above because the potential difference applied between the control gap anodes and the main cathodes is not sufficiently great. Where this potential is lower it is necessary that the transfer of discharge be first initiated between the control cathode and the main anode.

Upon the transfer of the discharge in the tube 311 to between the control anode and the main cathode an operating current flows through the winding of the start relay 312 which causes this relay to operate.

As described above only one subscriber's line tube associated with the cross bar switch shown in Fig. 3 can become fully operated. However, the subscriber line circuit tubes associated with other cross bar switches may become fully operated at substantially the same time as one of the tubes associated with switches shown in Fig. 3 becomes fully operated. In order to prevent improper operation therefore it is necessary to provide a lock-out arrangement so that the calls may be handled one at a time even though subscribers having lines associated with other cross bar switches simultaneously attempt to place calls.

In order to illustrate and describe the operation of the circuits under such circumstances we will now assume that a second subscriber as, for example, the subscriber at station 323 shown in Fig. 4, substantially simultaneously with the subscriber at station 333 shown in Fig. 3 initiates a call. Similar to the operation of the circuit as described above when the subscriber at station 333 initiates a call, when the subscriber at station 323 initiates a call battery 461 and resistor 462 are short-circuited or shunted by the line resistance which increases the potential difference across the control gap of tube 440 sufficiently to initiate a discharge across this gap. At this time the control anode is a few volts negative with respect to ground and the control cathode approximately 100 volts negative with respect to ground. The main cathode is at substantially 50 volts negative with respect to ground while the main anode is at approximately 130 volts positive with respect to ground. Under these circumstances as pointed out above, it is impossible to initiate or transfer a discharge from the control anode to the main cathode. However, when a discharge is initiated between the main anode and the control cathode as described above, all the line circuit tubes have their control cathodes connected directly in parallel and in series with the lock-out resistor 408 and lock-out conductor 406, while the main anodes are all connected directly in parallel and the parallel combination connected in series with the high resistor 465. These common impedances effectively prevent more than one transfer discharge from one control cathode and one main anode in the subscriber line circuit tubes associated with the cross bar switch shown in Fig. 4. Thereafter the discharge will be transferred to the main gap between the main anode and main cathode. At this time the current flowing in this main path is limited by resistor 465 so that insufficient current flows through the hold magnet 415 to operate the magnet. Sufficient current, however, flows through the resistor 465 to lower the potential of the control cathode of tube 411 so that a discharge is initiated between the control anode which is at substantially 130 volts positive and the control cathode. At this time the main cathode of tube 411 is at approximately 50 volts negative and the control cathode at a few volts positive and the control anode at substantially 130 volts positive so the discharge transfers at once across the gap between the control anode and the main cathode causing the second start relay 412 to operate.

Assume now that the two start relays 312 and 412 are simultaneously operated.

The operation of relay 312 connects the control cathodes of the primary select tubes 330 through 339 to conductor 307. The operation of relay 412 likewise connects the control gap cathodes of the primary select tubes 430 through 439 to conductor 307 which extends through Figs. 3, 4, 5 and 6 to the negative 50-volt battery shown at 652 in Fig. 6 through the lock-out resistor 650 and lock-out inductance 651. It should be noted that the control cathodes of all of these tubes are thus connected directly in parallel to the common lock-out impedance comprising resistor 650 and inductance 651 and then to negative 50-volt battery.

The operation of either relay 312 or 412 and thus the operation of both of them also connects ground to lead 360 extending through Figs. 4, 5, 6, 10, and 14 through the winding of relay 1410 to battery causing relay 1410 to operate.

Relay 1410 in operating connects a potential of approximately 55 volts positive with respect to ground to lead 1411. This 55 volts is derived from the 130-volt positive battery 1440 and the negative 40-bolt battery 1443 through potentiometer 1429.

The application of the positive 55-volt potential to lead 1411 marks all of the available or idle paths between the subscriber's line circuits and idle junctor circuits and register circuits in the following manner. Lead 1411 extends to break contacts of the off-normal relays of all of the register circuits. As shown in the drawing lead 1411 extends through Fig. 18 to the register circuits shown in Fig. 17. Here this lead is connected to the middle armature of the lower set of contacts of relay 1710 of the register 1703 and to similar contacts of relay 1720 of register 1705. The break contacts which cooperate with the above-described armature contacts of relays 1710 and 1720 are multipled together and connected to lead 1730 which extends to break contacts of the off-normal relays of the junctor circuits shown in Figs. 11 and 12. For example, lead 1730 extends through the upper break contacts of the off-normal relay 1113 of junctor 1101. It also extends to the upper break contacts of relay 1114 of junctor 1102. Lead 1730 is also connected to the upper break contacts of relays 1213 and 1214 of the respective junctor circuits 1201 and 1202.

The upper armatures of the off-normal relays 1113 and 1114 of the respective junctors 1101 and 1102 of the first group of junctors are connected to resistances 1127 and 1128, respectively, individual to these armature springs of the relays and the other terminals of these resistances are connected to the common lead 1126. The upper armature springs of relays 1213 and 1214 are connected to respective resistors 1227 and 1228 of the respective junctors 1201 and 1202 of the second group of junctors. The other terminals of these resistors are connected together to lead 1226. Lead 1126 extends through Figs. 7, 8, 9 and 10 and through the outer break contacts of relay 1030 to lead 1020 which extends through Figs. 8 and 9 to the condenser and resistance network 716. Likewise lead 1226 extends through Figs. 8, 9 and 10 and through the inner break contacts of relay 1030 and lead 1021 to the network condenser and resistance 816.

From the ungrounded terminal of network 716 a circuit extends through resistance 717 and the break contacts of the hold magnets 714 and 715 associated with the secondary cross bar switch 720 to the control gap anode of the primary select tubes 330 and 430 shown in Figs. 3 and 4. A circuit also extends through the break contacts of other hold magnets of the secondary cross bar switch 720 to the control gap anodes of other primary select tubes associated with other primary cross bar switches not shown in the drawing in a manner similar to that shown with reference to tubes 330 and 430. A connection likewise extends from the upper terminal of resistor 717 through the break contacts of the hold magnets associated with the secondary cross bar switch 920 to the primary select tubes 530 and 630. A circuit also extends through the break contacts of other hold magnets of the secondary cross bar switch 920 to the control anode of other primary select tubes associated with other primary cross bar switches of the primary secondary switch group. Similar circuits may be traced from the network 816 through resistor 817 and then through the break contacts of the hold magnets associated with the cross bar switches 829 and 1029 to the anodes of the control gaps of the primary select tubes 339, 439, 539 and 639 shown in the drawing as well as to the control gaps of other primary select tubes not shown in the drawing. Similar circuits also extend through the break contacts of the hold magnets of other secondary switches not shown in the drawing.

It is apparent that if any of the register circuits, junctor circuits or above-described hold magnets of the secondary cross bar switches are operated, the above-described circuit paths are interrupted. It is also apparent that the path through the off-normal relays of the registers will be completed so long as any one register is not busy. If, however, all of the registers are busy then the circuit from lead 1411 is interrupted and the system will remain in the condition described until some register becomes idle at which time the circuit is extended through the above-described back contacts of the idle register off-normal relays corresponding to relays 1710 and 1720.

Likewise as long as one junctor circuit of the first group is idle a circuit will extend from lead 1730 to lead 1126. As long as one or more junctor circuits of the second group are idle a circuit extends from lead 1730 to lead 1226. In case all the junctors are busy no circuit extends to either of these leads and the circuits remain in the condition described above until some one of the junctors becomes idle.

It is thus apparent that potential is applied to the control gap anodes of the primary select tubes only if one or more registers is idle, one or more junctors is idle, and an idle switching path extends from that junctor to the primary line switch to which the subscriber's line initiating the call is connected.

It is also apparent that the above-described arrangement connects potential to the control anodes of all of the primary select tubes which have paths leading to an idle junctor.

Assume now that all the circuits are all idle and that the two calls assumed above are the first two calls to be placed after power is applied to the system. Under these circumstances the operation of relay 1410 applies positive 55 volts to the left-hand terminals of the networks 716 and 816 through an equal number of resistors in the junctor circuits in both groups of junctors. As a result the potential on the right-hand terminals for both of these networks rises at substantially the same rate so that substantially the same potential is applied simultaneously to all of the control anodes of the primary select tubes associated with the primary cross bar switches 310 and 419. One of these tubes will start to conduct first and in conducting causes current to flow through the lock-out resistor 650 and lock-out inductance 651. This causes the potential applied to all the cathodes of all the primary select tubes connected thereto, i. e., the primary select tubes connected to switches 310 and 419 under the assumed conditions, to become more positive and thus tends to prevent a discharge through more than one of these tubes. However, inasmuch as resistor 717 is individual to one group of tubes and resistor 817 is individual to another group of tubes, discharges through a tube of each group may be simultaneously initiated depending upon the values of these resistors. It should be noted that the main anodes of all the primary select tubes are connected together and to lead 309 extending from Fig. 3 through Figs. 4, 5, 6, 10 to the positive 130 volts through the winding of the connector start relay 1412 and the upper break contacts of relay 1417. All of these main anodes thus have no individual impedance connected in series with them but are all connected together in series with the common impedance of the winding of relay 1412. The main cathodes of the primary select tubes are connected through the windings of the individual select magnets and then to either conductor 301 or 303 which conductors extend through the windings of the respective junctor start relays 1210 or 1110 to negative 48-volt battery. Under these circumstances with the above-described potentials applied to the various elements of the primary select tubes it is necessary in transferring a discharge from the control gap to the main gap that the discharge first take place between the control cathode and the main anode. As pointed out above all of the control cathodes are connected directly in parallel and then in series with the lock-out resistor 650 and inductance 651 while the main anodes are all connected directly in parallel and then in series with the common impedance of the connector start relay winding 412. Under these circumstances and due to the lock-out circuits, it is possible for one primary select tube only to conduct current in its main discharge gap. The initiation of this discharge effectively prevents the transfer of any discharge from the control cathode to the main anode in any other primary select tube. Thereafter the discharge transfers in this one tube from the main anode to the main cathode and causes the operation of two of the start relays described above and the associated select magnet.

If, instead of assuming that all of the junctors 1101 and 1102, 1201 and 1202, are idle, we assume that one of the second group, say 1201, is busy at the time the calls in question are made, then upon the operation of relay 1410 and the application of the voltage of approximately positive 55 volts to lead 1411, the condenser of network 716 will be charged through the two resistors 1127 and 1128 in parallel; whereas, the condenser of network 816 is charged through the single resistor 1228. Consequently, the condenser of network 716 will be charged at a faster rate. In addition, depending upon the magnitude of the resistances of networks 716 and 816 and the magnitude of the resistors 1127, 1128 and 1228, as well as 1227, the condenser of network 716 will be charged to a higher potential than the condenser and network 816. As a result of either or both of these effects upon the networks 716 and 816 and resistors 1127, 1128, 1227 and 1228, a higher potential is applied, during and after the charging of the condensers of networks 716 and 816, to the control anodes of tubes 330 and 430 than is applied to the tubes 339 and 439. As a consequence, a discharge will be initiated through either tube 330 or tube 430 before a similar discharge will be initiated through either of the tubes 339 or 439. In other words, tubes 330 and 430 are given a preference and caused to be operated first so that the call will be directed to either the junctor 1101 or 1102 instead of junctor 1202. Upon the completion of the connection and the initiation of another call, in which case one of the junctors 1101 and 1201 is busy, then the potential applied to the control electrodes of the primary select tubes will be of substantially the same magnitude and rise at substantially the same rate so that neither tube is given preference, and the first tube to conduct will select the path to be established through the switches.

In other words, a slightly higher potential is applied more rapidly to the anodes of the control gaps of the primary select tubes which are associated with switching paths leading to the junctor groups in which the most junctors are idle so that the anodes of the control gaps of these tubes reach the voltage required to initiate a discharge slightly before the anodes of the control gaps of the other primary selecting tubes reach the voltage required to initiate a discharge with the result that the probability is increased that a switching path leading to junctor groups and in which no junctors are idle will be selected. In this manner the traffic or calls are distributed over the switches and the load on the switches equalized. The only circumstances under which an incoming call will be directed toward the more busy group of junctors is in case the switching paths from the primary switch, to which the calling line is connected, to the junctors of the less busy group are all busy.

Assume now that tube 330 has a discharge initiated between the control elements thereof, which discharge is fully transferred to the main gap of the tube. At this time, a circuit extending through the select magnet 313, main gap 330 and the winding of relays 1110 and 1412 is completed. The select magnet 313 is slow in operating so that it does not immediately close its contacts and move the selecting fingers of the cross bar switch. Relay 1110, however, is fast in operating so that it closes its contacts a very short interval of time after the discharge is transferred to the main gap in the primary select tube 330.

Relay 1110 is a start relay associated with the secondary line switch 720. Inasmuch as the secondary line switch 920 has its horizontal levels of contacts connected in parallel with the horizontal levels of contacts of the switch 720, relay 1110 also serves as the start relay for the secondary switch 920. Relay 1110 is connected to operate in series with all of the primary select tubes associated with paths leading to either of these secondary switches. Other start relays will be associated with other secondary cross bar switches and connected in series with the primary select tubes associated with switching paths extending to the respective secondary switches. By providing such secondary start relays, it is possible to operate the select magnets and hold magnets of the respective switches in the proper order to establish the select transmission path through the switching equipment from the subscriber's line circuit to the junctor and then to the register circuit in the manner described hereinafter.

The operation of relay 1110 connects the 55-volt tap of potentiometer 1429 through the lower break contacts of relay 1418 and the lower operated contacts of relay 1110 to the control anodes of tubes 1111 and 1112 through resistors 1141 and 1142 and the lower break contacts of the respective off-normal relays 1113 and 1114.

With no discharge current flowing through the main gap of tube 1421, relay 1428 will be released with the result that the resistance and condenser network 1435 is connected to resistor 1142. Consequently, the potential applied to the control anode of tube 1112 will increase or rise slower than that applied to tube 1111 with the result that a discharge will be initiated in tube 1111 first. The potential supplied to the various electrodes of tube 1111 are similar to those applied to the subscriber's line tubes and the primary selector tubes so that even though a discharge may be initiated across the control gaps of two different tubes, the discharge can be transferred across the main gaps of one of the tubes only, due to the fact that the control cathodes are connected in parallel to the lock-out resistor 1105 and inductance 1106 and the anodes of these two tubes are connected in parallel to the impedance of the winding of relay 1427 and then to the positive 130-volt battery through the upper break contacts of release relay 1417.

Upon the transfer of the discharge to the main anode and cathode of tube 1111, a circuit is completed from negative 48-volt battery through the select magnet 712 of the secondary cross bar switch 720 to the main cathode of the tube 1111 and from the main anode of this tube over conductor 1143 which extends through Figs. 12, 13, through the right-hand break contacts and winding of relay 1427 to the positive 130-volt battery 1440 through the upper break contacts of release relay 1417. Relay 1427 is slow in operating so that it does not immediately operate at this time. The select magnet 712, however, is operated by current in the above-described circuit. This select magnet is designed to operate faster than the select magnet 313 so that the magnet 712 will be operated at the time the select magnet 313 operates. After magnet 712 has operated, relay 1427 will operate and insert resistance 1442 in series with the winding of the select magnet 712 and the main discharge path of tube 1111 thus reducing the current in this path to a value which, while maintaining a select magnet 712 operated, and relay 1427 operated, reduces the amount of current which must be carried across the main gap of tube 1111 and thus increases the life of this tube.

At about the time relay 1110 operates, relay 1412, which is connected in series with it, as described above, also operates. Relay 1412, in operating, interrupts the operating circuit for relays 1418 and 1030 and thus prevents these relays from operating. Operation of relay 1412 also connects the positive 55-volt lead from potentiometer 1429 through the lower break contacts of relay 1418, through the upper operated contacts of relay 1412 to the control anode of the control gaps of the gas tubes 1714 and 1724 over conductor 1413 through the respective resistors 1722 and 1723.

With no discharge flowing through the main discharge path of tube 1421, as assumed above, relay 1428 is released so the condenser and resistance network 1437 is connected to the circuit of the anode of the control gap of tube 1724. This network delays the application of the potential from the positive 55-volt tap of the potentiometer 1429 to the anode of the control gap of tube 1724 without affecting the potential applied to the control gap of tube 1714, so tube 1714 will have a discharge initiated across its control gap at this time. Tubes 1714 and 1724 are connected in a lock-out circuit similar to that described above so that a discharge can be transferred to the main discharge path in only one of these tubes, even though discharges may be initiated between the control anode and control cathode of more than one of the tubes. Let us assume that a discharge is thus initiated through tube 1714 and is fully transferred to the main discharge gap of this tube.

Upon the transfer of the discharge to the main discharge path of the tube 1714, a circuit is completed from negative 48 volts through the selector magnet 1310 of the register connector cross bar switch 1301 through the main gap of tube 1714 to positive battery through the winding of relay 1426 and the upper break contacts of release relay 1417. As a result, the selector magnet 1310 and relay 1426 are operated in series at this time. If desired, relay 1426 may be made slow to operate and provided with an extra set of contacts similar to relay 1427 and arranged to insert a resistor similar to resistor 1422 in series with the select magnet 1310 after this magnet and relay 1426 have operated fully.

The operation of the select magnet 313 which is finally completed after full operation of the select magnet 712, as described above, closes its lower contacts which short-circuits the high resistance 365 which was limiting the current through the main discharge gap of tube 330 and the hold magnet 315. As a result, the current flowing through the hold magnet 315 is increased so that this magnet now operates. The operation of the hold or vertical magnet 315 at the time the select magnet 313 is operated closes the contacts 351 at the cross-point. Closure of these contacts completes a circuit for maintaining the hold magnet 315 operated from negative 48-volt battery through the winding of hold magnet 315 and the lower set of contacts 351 to ground through the upper operated contacts of the select magnet 313.

The operation of the primary select magnet 313 also completes a circuit for the operation of hold magnet 715 in a circuit extending from negative battery through the winding of the hold magnet 715 to ground through the upper operated contacts of the select magnet 313. The operation of the hold magnet 715 at the time the select magnet 712 is operated causes the contacts 755 at the cross-points to be operated in a well-known manner, as set forth in the above-identified patent to Reynolds.

The operation of the cross bar contacts 755 extends the ground from the upper operated contact of the primary select magnet 313 over the sleeve conductor, and through the break contacts of relay 1140 to the winding of the hold magnet 1320, thus operating this magnet. The operation of the hold magnet 1320 at the time the selector magnet 1310 is operated, as described above, closes the contacts 1331 at the cross-point. The closure of these contacts together with the previous closure of the contacts 351 and 755 extends the subscriber's line circuit to the junctor circuit 1101 and to the register 1703 of Fig. 17. In other words, the tip and ring conductors which extend to the subscriber's station are connected to the left-hand terminals of the both windings of relay 1713. Due to the fact that the subscriber's loop is closed by the contacts at the subscriber's station at this time, relay 1713 operates and completes an obvious circuit for the operation of relay 1710. Relay 1710, in operating, interrupts the above-described circuit from lead 1411 to lead 1730 thus indicating that the connector 1703 is busy. Operation of the relay 1710 also disconnects the control anode of tube 1714 so that further discharges will not be initiated through tube 1714 until the register circuit has been restored to normal. The relay 1710 in operating, also applies dial tone through its upper outer operated contacts and lower break contacts of relay 1715 to the subscriber 333 through the above-enumerated operated cross bar contacts.

The operation of relay 1710 also applies ground to the sleeve conductor and thus maintains the hold magnets 1320, 715 and 315 operated independently of the operation of the select magnet 313. This holding circuit may be traced from ground through the inner upper operated contacts of relay 1710 to the sleeve conductor through the second contacts from the bottom of the closed cross bar contacts 1331 to battery through the winding of hold magnet 1320 and also from the second set of contacts from the bottom of the cross bar contacts 1331 and through the break contacts of the register release relay 1140, through the lower operated contacts of the cross bar contacts 755 to battery through the winding of the hold magnet 715 to battery and also through lower operated cross bar contacts 755 and through the lower contacts of the crosspoint contacts 351 to battery through the winding of the hold magnet 315.

The operation of relay 1710 also connects the positive 130-volt battery through its lower inner operated contacts to the pulse-forming network 1721. In the exemplary embodiment of this invention set forth in detail herein network 1721 comprises two resistors and a condenser as shown in Fig. 17. This network may take any suitable form for applying a pulse of short duration to the diode tube 1719. Tube 1719 is connected in such a way as to pass this pulse of current. This tube, together with the corresponding diodes in other registers and diode 1122 and corresponding diodes in other junctors and diode 1424 in the release and preference circuit are isolating tubes and arranged so that any one of them may transmit a pulse to lead 1725.

The above-described positive pulse transmitted through the diode 1719 is applied to the auxiliary anode associated with the main cathode in tube 1416 and thus initiates a discharge between these elements which discharge immediately transfers to the main gap of tube 1416. As a result, the main anode of this tube has its potential reduced and, due to the coupling action of condenser 1423, the potential of the anode of tube 1415 is likewise reduced so that the discharge through this tube is extinguished, during the time condenser 1423 is being charged through the resistor 1441.

Upon the transfer of the discharge across the main gap of tube 1416, a circuit for operation of relay 1417 is completed from the positive 130-volt battery 1440 through the winding of relay 1417 and the main discharge path through tube 1416 to negative 48-volt battery connected to the main cathode of this tube. Relay 1417, in operating, discharges the upper terminal of condenser 1414 which has been charging as will be described hereinafter. Relay 1417, in operating, also connects direct ground to the lead 304 thus removing the negative 105-volt potential from the control cathodes of all the subscribers' line tubes. The operation of release relay 1417 also removes the positive 130-volt battery from lead 305 and thus from the anodes and cathodes of the start tubes of the primary cross bar switches and from the main anodes of the subscriber's line tubes thus effectively extinguishing all discharges in these tubes and causing the associated start relays to release.

The operation of relay 1417 also removes the positive 130-volt potential from lead 309 through the winding of relay 1412 which extends to the main anodes of all of the primary select tubes thus releasing relay 1412 and interrupting the discharge through all of the primary select tubes. Removal of this battery from lead 309 also interrupts the above-described circuit for the operation of relay 1110 which relay also releases at this time. Operation of relay 1417 removes the positive 130-volt potential from the winding of relays 1426 and 1427, thus permitting these relays to release and also extinguishing the discharge across the main gaps of tubes in the registers such as tube 1714 and the lock-out tubes in the junctors such as tube 1111. The operation of relay 1417 also removes the positive potential from the positive 55-volt tap of potentiometer 1429 and thus from the anodes of the control gaps of the primary select tubes, the junctor lock-out tubes and the register lock-out tubes which, under the assumed conditions, were primary selector tube 330, junctor lock-out tube 1111 and register lock-out tube 1714.

It should be noted that the removal of the positive 130-volt potential and the positive 55-volt potential from the various tubes and circuits described above leaves a negative potential of approximately negative 48 volts from battery 1443 connected to all of the above-described electrodes of the various tubes. This negative potential speeds the deenergization of these tubes so that the normal potentials may be applied thereto without again creating discharges through the tubes after a relatively short interval of time.

Thus, a connection has been established from the subscriber's line 333 to the junctor circuit 1101 and register circuit 1703, and the various tubes employed in selecting a path from the subscriber's line to the register all extinguished, and the various relays and select magnets released without interrupting the above-described connection.

After a time interval sufficiently long to provide ample margins to permit the tubes to become deionized, and the above-described relays and select magnets to release, condenser 1423 will become sufficiently charged through resistor 1441 to initiate a discharge between the main cathode 1431 and the auxiliary anode 1434 of tube 1415. This discharge is immediately transferred to the main discharge gap of tube 1415 and causes the potential of the main anode 1430 to be reduced. Reduction of this potential also causes a reduction in the potential of the main anode of tube 1416 due to the coupling action of condenser 1423 so that the discharge through tube 1416 is interrupted. The interruption of the discharge through tube 1416 causes relay 1417 to release. The release relay 1417 is restored to its normal condition whereupon the above-described operating potentials are again applied to the various tube elements so that another connection or communication path may be established through the cross bar switches in the manner described above without interfering with the paths already established through the cross bar switches.

In addition to the above-described function, relay 1417 in operating at the completion of the establishment of a connection applies a positive potential to network 1444. This network applies a positive pulse to the auxiliary anodes associated with the main cathodes of both tubes 1420 and 1421. Assuming that the discharge is taking place across the main gap of tube 1420 the discharge initiated across the control anode and main cathode of this tube performs no useful function. The discharge created between the auxiliary anode and the main cathode of tube 1421, however, causes a discharge to be immediately initiated between the main anode and the main cathode of this tube. As a result, the potential of the main anode of tube 1421 is reduced and this in turn reduces the potential of the anode of tube 1420 due to the coupling action of condenser 1422 so that the discharge through tube 1420 is interrupted.

The establishment of a discharge across the main gap of tube 1421 completes an obvious circuit for the operation of relay 1428. Thereafter, a discharge is maintained through tube 1421 until the release relay 1417 is again operated at which time a discharge through tube 1420 is initiated and the discharge through tube 1421 interrupted in a manner similar to that described above in initiating a discharge through tube 1421 and interrupting the discharge through tube 1420. In other words, during alternate calls, tube 1421 is conducting and non-conducting and thus relay 1428 is operated and not operated.

The operation of relay 1428 transfers the resistance and condenser networks 1435, 1436 and 1437 from the control anodes of the register and junctor lock-out tubes to which they are connected as shown in the drawing and connects these networks to the control anodes of the tubes of the alternate groups of these circuits thus giving preference on the next call to these alternate circuits and in this manner tending to uniformly distribute the calls between the various junctor and register circuits. In other words, different groups of tubes are preconditioned on alternate calls so that the probability of a discharge taking place within the preferred group is greatly increased in the manner described herein. In short, more favorable discharge initiating voltages are applied to different groups of the tubes on successive calls.

*Recording the called station number*

The subscriber upon receiving dial tone as described above will then start to dial the called subscriber's number. The dial pulses are transmitted to the central switching station over the subscriber's line and over the connection established through the cross bar switches as described above to relay 1713. This relay will follow the dial pulses and repeat them to any suitable type of registering or storing equipment. Various types of pulse-counting registering and storing equipment are well known in the art and any type desired may be employed in combination with the other circuits of the exemplary system described in detail herein.

As is well understood by persons skilled in the art any suitable number of digits may be assigned to the subscriber's stations and these digits are dialed in the proper order by the calling subscriber when he wishes to communicate with any one of the other subscriber stations. In the exemplary embodiment described herein it has been assumed that each of the subscriber's stations will be given a 3-digit number so that in order to call any other station a subscriber must dial three digits. It is to be understood, that the system may be arranged to operate satisfactorily where there may be less or more than three digits required to designate a subscriber's station.

A typical example of a suitable type of recording equipment is described in greater detail in U. S. Patent 1,395,977 granted November 1, 1931, to F. A. Stearn and F. J. Scudder, the disclosure of which patent is hereby made a part of the present application as if fully included herein. Fig. 8 of the above-identified patent to Stearn et al. shows certain of the controlling relays and recording switches employed to record the first three digits of a number. The switch RS is the register steering switch, while switch A records the first digit dialed, switch B the second, and switch C the third. In addition, relay 800 corresponds to relay 1713 and may be substituted for relay 1713. Relay 802 is a slow-release relay which is operated from the operated contacts of relay 800 and corresponds to relay 1710. It may be desirable to operate relay 1710 from some front or make contacts on relay 802 instead of being substituted for relay 802 with the additional contacts required.

Relay 1715 is provided to remove dial tone after the first digit has been dialed. This relay will, therefore, be controlled from the register steering switch RS in an analogous manner to the removal of a dial tone in the register shown in the above-identified patent when the register steering switch advances from its No. 1 position. This arrangement is indicated in Fig. 17 by controlling relay 1715 from an unused set of contacts on the register steering switch RS. Fig. 17 also shows one set of contacts on the A switch, another on the B switch, another on the C switch. These contacts and the associated switch arms are stepped around under control of the dial pulses and thus indicate the number dialed. The A switch records the first number or digit dialed, the B switch the second and the C switch the third number.

The other features included within the register disclosed in the above-identified patent to Stearn et al. may be incorporated in the register employed in the exemplary system described herein and in particular those features shown in Fig. 8. It is noted that provision is made in the above-identified patent to Stearn et al. for recording four additional digits. These additional switches and circuits may be omitted as will be readily apparent because these digits are not required. Under the assumed conditions wherein the subscriber station 333 was calling subscriber 221 the A switch will be stepped to its No. 2 position in response to the two dialed as the first digit, the B switch will be stepped to its No. 2 position in response to the two dialed as the second digit, and the C switch will be stepped to its No. 1 position in response to the one dialed for the third digit. Thus these switches record the digits dialed.

In the above description, it was assumed, of course, that the switch had been returned to its normal or idle condition in a manner described in the above-identified patent to Stearn et al., before the register became idle and was made available for recording the called subscriber's number. Such circuits are understood to be included within the register employed in combination of the exemplary switching system described herein in detail.

At the completion of the last digit dialed the register steering switch RS will take another step and be advanced to its No. 4 position where a circuit is completed which causes relay 1718 to operate. Relay 1718 in operating connects the anode of the control gap of tube 1716 to the release and preference circuit over conductor 1732 preparatory to firing register lock-out tube 1716. It also connects ground to the lead 1733 which sets the release and preference circuit in condition to establish a connection from the junctor circuit 1101 to the called subscriber's line through the cross bar switches under control of the register circuit 1703 in a manner described hereinafter.

*Completing a call to the called subscriber's station*

If the switching equipment is in the process of establishing a connection from a subscriber's station or line to a register circuit, relay 1412 will be operated as described above. Consequently, the application of ground to lead 1733 produces no effect until this connection has been established and the release circuit operated as described above. If, on the other hand, the system is in the process of establishing a connection from the junctor circuit to a subscriber's line, ground is already applied to lead 1733 so that the operation of relay 1718 will not be effective until after the connection in the process of being established at the time this relay operates, is completed and the release circuit actuated.

Assume now that prior to the operation of relay 1718, the release circuit and circuits employed in establishing connections through the cross bar switches are idle. It is also assumed that the release circuit has previously operated, and restored the control circuits to a condition such that they are ready to establish another connection through the cross bar switches.

Under these conditions, the operation of relay 1718 applies ground to lead 1733 which lead extends through Figs. 17, 18, and 14, through the lower break contacts of relay 1412 and through the windings of relays 1418 and 1030 to the battery. Relays 1418 and 1030 operate at this time, placing the system in condition to handle a terminating call. The operation of relay 1418 connects ground to lead 304 thus grounding control cathodes of all the subscriber's line tubes which prevents any discharge from being initiated from any of these tubes. Relay 1418, in operating, also removes the positive 55 volts from the leads extending through the upper contacts of relays 1412 and 1110 and 1210 which leads extend to the junctor lock-out tubes and the register lock-out tubes thus preventing a discharge across the control gap of any of these tubes. Relay 1418 when operated also completes a circuit for maintaining itself and relay 1110 operated from battery through its winding and upper outer contacts to ground over lead 1733 and through the lower operated contacts of relay 1718. Relay 1030 is maintained operated in a circuit extending from battery through its winding and through the upper outer operated contacts of relay 1418 to ground over lead 1733 and through the lower operated contacts of relay 1718.

Relay 1418, in operating, connects positive battery through its lower inner operated contacts to the pulse forming network 1425. The positive pulse formed by the resistance and condenser network 1425 is transmitted through the diode 1424 to the control anode associated with the main cathode of the release tube 1416. This positive pulse initiates a discharge between the control anode and the main cathode and operates the release relay 1417 as described above. The operation of the release relay extinguishes any line tube which may have been fired by a waiting originating subscriber. At the end of the operation of the release circuit, relay 1417 releases, as described above, at which time the potentials are reapplied to the system, permitting a connection to be established to a called subscriber's station as described hereinafter.

Operation of relay 1418, in addition applies positive 55 volts from potentiometer 1429 to the delay network 1419 in lead 1732 which lead extends through Figs. 18 and 17 to the control anode of tube 1716 of register 1703 through the upper operated contacts of relay 1718. Lead 1732 likewise extends to the anode of the control gap of the other lock-out tubes of any other registers which may also be attempting to establish a connection from a junctor to a called subscriber's line. In this case it should be noted that these tubes are connected in a lock-out circuit similar to the lock-out circuit arrangement provided for the various groups of tubes described above so that only one tube can fire, the other being locked out.

The delay network 1419 is interposed in series with lead 1732 to delay the application of potential to the anode of the control gap of tube 1716 and the corresponding tubes of the other registers which are waiting to establish a connection to a calling subscriber's line so that a momentary discharge is not initiated across any control gap in any of the lock-out tubes of the registers corresponding to the tube 1716 before the release circuit is actuated to remove the operating potential from the various tubes of the switching office.

Then, upon the restoration of the release circuit to its normal or idle condition, positive 55 volts is again applied to the tap of potentiometer 1429 which potential is also applied through the lower outer operated contacts of relay 1418 and through the delay network 1419 to the anode of the control gap of the register lock-out tube 1716.

For the purpose of illustration, assume that a discharge is started across the control gap of tube 1716 when relay 1417 releases. This discharge is then transferred to the gap between the main anode and the control cathode and then between the main anode and the main cathode in the manner described above.

Upon the establishment of a discharge across the main gap of tube 1716 a circuit is completed for the operation of relay 1717 from battery through the winding of relay 1717 and through the main discharge path through tube 1716, the winding of relay 1426 to the positive 130-volt battery through the upper outer break contacts of relay 1417. The operation of relay 1717 completes a circuit for maintaining relay 1718 operated independently of the position of the brush arms of the register steering switch RS.

The lock-out relay 1717, in operating, also connects the lead from the contacts of the registers A, B and C to the resistance network shown in Fig. 18. While any selecting arrangement may be employed, the exemplary embodiment set forth herein has been arranged to cooperate with the selecting arrangement shown and described in United States Patent 2,317,471, Meacham, April 27, 1943.

Briefly, the resistance network comprises thirty low resistances 1810, only a portion of which are shown in Fig. 18. One such resistance is provided for each numeral of each denominational order of the number dialed. The above resistance network is interconnected with a second resistance network comprising high resistances 1815. It is desirable that the ratio between resistances 1815 and 1810 be greater than approximately 50 to 1.

As indicated in Fig. 18, each contact of the register switches extends to one of the low resistances 1810. The other ends of the low resistances 1810 are connected to negative 48-volt battery 1811, which tends to make all the resistors at a negative potential with respect to ground. The brush arms of the register switches are connected to positive 48 volts so that for the three leads upon which these three brushes are set, the voltage of the upper terminals of the associated three resistors 1810 changes from negative 48 volts to positive 48 volts.

The high resistors 1815 are arranged in groups of three with one terminal connected to a common terminal and this terminal in turn connected through a cross-connection apparatus or frame 1812 to the auxiliary anode of the subscriber's line tubes. The other end of each of the three high resistances of each network is connected to one of the leads from each digit from the register switches. All of the leads except those with which the register switch arms are in contact are therefore maintained at a negative potential. The three leads upon which the brush arms of the register circuit are resting are at positive 48 volts.

The common terminal of all the three resistance networks which do not have any resistance connected to one of the three conductors upon which the brush arms of the register switches are resting will thus be substantially at negative 48 volts. The common terminal of a smaller group of the three resistance networks which have one resistor extending to one of the terminals upon which the brush arms of the register are resting and the other two resistors extending to terminals upon which the brush arms are not resting will be at a potential of substantially negative 16 volts. Likewise, those three resistor networks having two resistances connected to terminals upon which the register brush arms are connected will have a potential of approximately positive 16 volts on their common terminal. Only one three-resistance network will have all three of its resistors connected to terminals or leads on which the register brush arms are resting.

The group of three resistors which have their terminals all connected to these three leads will have 48 volts positive at their common point, whereas all other high resistor networks 1815 will have their common point at a substantially lower potential. For example, the third high resistance network from the bottom in Fig. 18 has its lower resistance connected to the conductor connected to the No. 2 contact of the hundreds register, the middle resistance connected to the No. 2 lead which extends to the No. 2 contact of the tens register, and the third one extends to the lead connected to the No. 1 contact in the units register. Thus this resistance network together with the register circuit has identified the calling subscriber's line. Thus the lead 221 will have a substantially more positive voltage (32 volts difference or more) applied to it than any of the other leads extending from the network to the subscriber line tubes. This lead 1813 extends through the cross-connection frame 1812 so that it may be associated with the line on any one vertical contact group on the primary cross bar switches of the entire office. The positive 48-volt potential applied to this lead is sufficiently high, when added to the negative 48-volt potential of the main cathode, to initiate a discharge between the main cathode and the auxiliary anode of the designated subscriber's line tube 649 which, under the assumed conditions, is the subscriber's line tube associated with the subscriber's line 221.

The discharge through this tube 649 is transferred across the main discharge path of this tube and causes a small current to flow through the hold magnet 617 and also through the high resistance 665. This current is insufficient to operate the hold magnet 617 at this time.

The small discharge current flowing across the main discharge gap of tube 649 and through the high resistance 665, however, causes a sufficient potential drop across resistor 665 to lower the potential of the cathode of the control gap of tube 611 so that a discharge is initiated across this gap. This discharge is immediately transferred, as described above with reference to start tube 311, between the start anode and the main cathode, causing the start relay 612 to operate. The operation of relay 612 connects the negative battery 652 through the lock-out impedance comprising the resistor 650 and the inductance 651 to the control gap cathodes of tubes 639 and 639 and the other primary select tubes (not shown) associated with the cross bar switch of Fig. 6, preparatory to initiating a discharge across one of these gaps by potential applied to the anode of the start gap thereof as will be described.

The operation of relay 612 also complets a circuit for the operation of the start relay 1410 by connecting ground to lead 360. However, relay 1410 performs no useful function in the setting up of a terminating call because the circuit lead 1411 through leads 1739, 1126 and 1226 is open at the contacts of the operated relay 1030. Consequently, the positive 55 volts applied to lead 1411 by relay 1410 does not affect the operation of the circuits at this time.

Relay 1717, in operating, also connects ground to the conductor 1727 which extends through the lower set of operated contacts 1331 of the register connecting cross bar switch 1301 to lead 1340 which extends through Fig. 12 and Fig. 11 to the winding of the select magnet 1510 of the tertiary cross bar switch shown in Fig. 15. The other side of a selector magnet extends to battery through the winding of relay 1512. Lead 1340 also extends to battery through the lower winding of relay 1117 and to battery through the lower winding of relay 1120. Upon the application of ground to this lead by relay 1717, relays 1117, 1120, the select magnet 1510, and the tertiary start relay 1512, all operate.

The operation of relay 1117 at this time transfers the tip and ring conductor from the calling subscriber's line which had been connected through the cross bar switch to the windings of relay 1713 of the register circuit 1703 in the manner herein described before, to the windings of relay 1118 of the junctor circuit 1101 thus causing relay 1118 to operate and relay 1713 to release. Relay 1118 in operating, however, applies ground to the sleeve conductor and thus completes a circuit for maintaining relay 1117 operated in a circuit extending from ground through the operated contacts of relay 1118 and the upper inner operated contacts of relay 1117 and upper winding of relay 1117. The ground from the operated contacts of relay 1118 is applied to the sleeve conductor before relay 1713 releases and removes the ground that it had previously been applying to this conductor, thus maintaining all of the cross bar hold magnets 315, 715 and 1320 operated. Operation of relay 1117 also completes circuits through both windings of the register release relay 1140 from battery through the lower operated contacts of relay 1117 to ground through both windings of relay 1140. The circuit through the lower winding of relay 1140 extends through the upper operated contacts of relay 1117 to ground over conductor 1340 through the operated cross-point contacts 1331, conductor 1727, and the operated contacts of relays 1717. The circuit through the upper winding of relay 1140 may be traced to ground on the sleeve conductor which ground is applied first by the upper inner operated contacts of relay 1710 and later by the upper operated contacts of relay 1118 as described above. The currents flowing through the two windings of relay 1140 produce opposite magnetic effects upon the magnetic circuit or structure of this relay so relay 1140 does not operate at this time.

The operation of relay 1512, as described above, connects positive battery 1440 through the upper break contacts of the release relay 1417 and lead 1445 which extends through Figs. 18, 17 and 16 and through the operated contacts of relay 1512 to the armatures of the hold magnets 1520 and 1521 of the cross bar switch shown in Fig. 15. This lead is also extended over conductors through the break contacts of the other hold magnets of the switch of Fig. 15 (not shown in the drawing) which are idle to the armatures of the hold magnets of the secondary cross bar switches having horizontal trunks extending to the vertical elements of the tertiary cross bar switch shown in Fig. 15. For example, assume that both the hold magnets 1520 and 1521 are idle. A circuit then extends from the positive 130-volt battery connected through the lower inner operated contacts of relay 1512 as described above, through the break contacts of the hold magnet 1521 over lead 1541 which extends through Figs. 11 and 7, through the winding of the select magnet 710 and then through the outer operated contacts of relay 1030 over lead 1020 to the network 716 and resistor 717, then through the break contacts of the hold magnets 714 and 715 if they are idle. Under the assumed conditions, the hold magnet 715 is operated so that the circuit will not extend through its break contact. It will extend through the break contacts of magnet 714, however, to the anode of the control gap of tube 430. Likewise, a circuit extends from the upper terminal of resistor 717 through the break contacts of the hold magnets 914 and 915 if these magnets are released. A circuit extends from the break contacts of the hold magnet 914 to the anode of the control gap of tube 630 and from the break contacts of the hold magnet 915 to the anode of the control gap of tube 530.

Likewise, the circuit may be traced from the positive 130 volts connected to the upper operated contacts of relay 1512 through the break contacts of the hold magnet 1520 over conductor 1540 which extends through Figs. 16, 12 and 8, the winding of select magnet 810, the inner operated contacts of relay 1030, lead 1021, to the network 816 and the resistor 817 and then through the break contacts of the hold magnets 814 and 815. From the break contacts of the hold magnets 814 the circuit extends to the anode of the control gap of tube 439. From the break contact of the hold magnet 815 the circuit extends to the anode of the control gap of tube 339.

From the resistor 817 the lead also extends through the break contacts of the hold magnets 1014 and 1015. From the break contacts of the hold magnet 1014 the circuit extends to the anode of the control gap of tube 639 and from the break contact of relay 1015 it extends to the anode of the control gap of tube 539.

The above described leads also extend through other idle paths of the secondary switches shown in the drawings through the break contacts of the other hold magnets not shown in the drawing to other levels of the primary cross bar switches and thus to other primary-select tubes not shown in the drawing, but nevertheless understood to be incorporated in an exemplary system. These leads also extend over similar circuit paths through the various break contacts of the hold magnets of other cross bar switches not shown in the drawing, but clearly understood to be incorporated in exemplary systems embodying the present invention. Inasmuch as these other paths and switches are well understood by persons skilled in the art to be present, inasmuch as they cooperate with various elements of the system set forth herein in a well understood manner, they have not been shown as described in detail because they would add nothing to the understanding of the exemplary system, this mode of operation or the invention incorporated therein.

However, inasmuch as only the start relay 612 is operated, only the cathodes of the control gaps of tubes associated with the cross bar switch shown in Fig. 6 will have negative 48 volts supplied to them. The primary select tubes of the switch shown in Fig. 6 are connected in a lock-out circuit similar to the lock-out circuit described above with reference to the primary select tubes of Figs. 3 and 4. Consequently, only one primary select tube of Fig. 6 is operated in response to the above-described potential supplied to the anodes of the control gaps.

Upon the transfer of the discharge to the main gap of tube 639 a circuit is completed from negative battery through the winding of relay 1210 over conductor 301 which extends through Figs. 12, 8, 7, 3, 4, 5 and 6 to the select magnet 614 and then through the winding of the select magnet and across the main gap of tube 639 and over lead 309 which extends through Figs. 10 and 14, and then through the winding of relay 1412 to the positive 130-volt battery 1440 through the upper break contacts of relay 1417. Relays 1210, 1412 and the select magnet 614 operate in series in the above-described path. The operation of relay 1412 at this time is without effect upon the further operations of the circuits because relay 1418 is operated and has interrupted the circuit through the upper outer operated contacts of relay 1412 at the outer lower operated contacts of relay 1418. The other contacts of relay 1412 are also rendered ineffective by other contacts on relay 1418.

Relay 1210 in operating as described above, operates much faster than select magnet 614 and connects ground through its inner operated contacts to the windings of the select magnets 810, 811, 1010 and 1011. The select magnets 810 and 1010 then operate in a circuit extending from ground through the inner operated contacts of relay 1210 and the windings of the select magnets 810 and 1010, lead 1540 through the break contacts of the hold magnet 1520, operated contacts of the start relay 1512 over conductor 1445, to positive battery through the upper break contacts of relay 1417. These select magnets operate prior to the operation of the select magnet 614.

Upon the operation of the select magnet 614, the high resistance 665 is short-circuited by the lower operated contacts of the select magnet 614 so that the current flowing across the main discharge gap of tube 649 and through the winding of the hold magnet 617 is increased sufficiently to cause the hold magnet to operate and close the contacts 656 at the cross-points between the hold magnet 617 and the operated select magnet 614. The operation of these contacts completes a circuit for maintaining the hold magnet 617 operated from battery through this winding and the lower operated cross-point contacts 656 and to ground through the upper operated contacts of the select magnet 614.

The operation of the select magnet 614 also completes the circuit for the operation of the hold magnet 1014 from battery through the winding of hold magnet 1014 to ground through the upper operated contacts of select magnet 614. When the hold magnet 1014 operates, select magnet 1010 having been operated, as described above, the cross-point contacts 1050 are closed.

The closure of the cross-point contacts 656 and 1050 extends the line circuit of the subscriber line 221 to the trunk circuit or tertiary link circuit extending to the tertiary cross bar switch shown in Fig. 15. At this time the circuit for the operation of the hold magnet 1520 is completed from battery through the winding of the hold magnet 1520 over conductor 1542 which extends through Figs. 16, 12, 8 and 9, and the lower operated cross bar contacts 1050 to ground through the upper operated contacts of the select magnet 614.

With the select magnet 1510 operated, as described above, the operation of the hold magnet 1520 closes cross-point contacts 1530.

The operation of the cross-point contacts 1530 connects ground through the upper operated contacts of relay 1118 to the sleeve conductor which extends through the second set of contacts from the bottom of the cross-point contacts 1530 and then to the winding of the hold magnets 1520, 1014 and 617 for maintaining these magnets operated independently of the continued operation of the select magnets 614.

The operation of the lower set of contacts of the cross-point contacts 1530 completes a circuit for the operation of relay 1115 from ground through the winding of relay 1115 and resistor 1150 and through the lower contacts of the operated cross-point contacts 1530 to battery 1543.

Relay 1115 in operating disconnects busy tone from the lower front contacts of relay 1120 and connects ringing current from the ringing trip relay 1116 to these contacts.

The operation of the contacts 1530 also extends the subscriber's line circuit of the subscriber station 221 through the operated cross-point contacts 656, 1050 and 1530 to the front contacts of relay 1120 and thus applies ringing current to the subscriber's line.

The operation of the lower contacts of cross-point 1530 also connects the positive battery 1543 to the pulse forming network 1121 which causes a pulse to be transmitted through the diode 1122 and over lead 1725 which extends through Figs. 12, 13 and 14 to the auxiliary control anode of the release tube 1416. This positive pulse initiates a discharge between the main cathode and the auxiliary anode of this tube which discharge is immediately transferred to the main discharge anode and causes the release circuits to operate as described above and operate the release relay 1417. Release relay 1417 interrupts the potentials applied to the various electrodes of the conducting tubes in the same manner as described above with reference to the previous operations in the release circuit. Thereupon, the discharges through the various tubes such as 611, 649, and 1716 are interrupted and relays 1410, 1210, 1426 and 1717 are released.

The release of relay 1717 interrupts the circuit through the windings of select magnet 1510 and relay 1512 thus causing their release. The release of relay 1717 also interrupts the circuit through lower winding of relay 1140 which relay then operates due to current flowing in its upper winding.

Relay 1140, in operating, interrupts the circuit of the sleeve conductor to the register connector cross bar switch 1301, thus interrupting the circuit of hold magnet 1320 which permits this magnet to release. Release of magnet 1320 causes the cross bar contacts 1331 to release and completely disconnect the register circuit 1703 from the junctor 1101. Upon the release of the hold magnet 1320 and the restoration of the register circuit 1703 to their normal or idle condition, this register may be employed to receive and register dial pulses from other subscriber stations.

The release of relay 1512 interrupts the circuit of the select magnet 1030 which magnet then releases. The interruption of the discharge through tube 649 causes the select magnet 614 to release.

If another register is ready to control the establishment of a connection to a called subscriber's line, relays 1418 and 1030 will not release at this time, but will be held operated by the other register. Then when the release circuit returns to its normal condition the above cycle of operations will be repeated and another connection made to a called line in a similar manner.

If, however, no other register is ready to establish a connection to a called line, then the release of relay 1717 as described above causes the release of relays 1418 and 1030 and thus conditions the system for handling the next connection.

When the subscriber answers, the ring-trip relay 1116 is operated which interrupts the locking circuit of relay 1120, thus permitting relay 1120 to release and extend the talking path to the coupling condensers 1130 and 1131 and also to the windings of the talking battery supply relay 1119. This relay supplies talking battery through its windings and operates in response to this current and in addition applies an additional ground to the sleeve conductor thus maintaining the circuits established so long as the called subscriber has his receiver off the hook or his handset off the cradle.

At the completion of the call, both subscribers hang up and cause both relays 1118 and 1119 to release, whereupon ground is removed from the sleeve conductor and thus from the windings of the hold magnets 315, 715, 1520, 1014 and 617, thus permitting the respective cross-point contacts 351, 755, 1530 and 1050 and 656 to be released and restore the cross bar switch circuits and the subscriber's line circuits and equipment associated with lines 333 and 221 to their normal or idle condition wherein they are available for use in establishing connections between the same or other subscriber stations.

In the above descriptions, it has been assumed that the connections were immediately established through the various cross bar switches and related circuits. Due to busy conditions, and occasionally trouble conditions, the circuits and paths may not be immediately established through the cross bar switches. Under these circumstances, it is desirable to provide a time-out arrangement so that the circuits will not remain in an off-normal condition until a path becomes idle or until some trouble condition is corrected or until an attendant makes some change in the circuits or equipment such as operating a key or switch or the like. Such time-out circuits are provided and comprise a condenser resistance network 1414 shown in Fig. 14. When the start relay 1412 is operated, the 130-volt battery 1440 is connected through the upper break contacts of relay 1417, the high resistance 1446, and the upper inner operated contacts of relay 1412 to the condenser 1414. This condenser starts to charge in this circuit, and after a time interval dependent upon a time constant of the network 1414 and resistor 1446 the upper terminal of condenser 1414 will reach a sufficiently high potential to cause a discharge to be initiated across the control gap of the release tube 1416, and thus set the release circuit into operation as described above. Likewise, the operation of any of the relays 1418, 1426 and 1427, similarly connects the 130-volt battery 1440 through an operated contact of these relays to the upper terminal of condenser 1414 through the high resistance 1446. Thus, after a predetermined time interval dependent upon the above-described time constant, the release circuit is operated in the manner described above.

If the circuit connections and paths are fully set up and established within the specified time interval, no discharge is initiated across the control gap of the release tube 1416 because the operation of relay 1417 connects ground through its lower outer operated contacts to the upper terminal of condenser 1414, thus discharging the condenser before the voltage of its upper terminal is sufficient to initiate a discharge through the control gap of the release tube 1416.

If, however, the circuit path is not established within this predetermined time interval, then the upper terminal of condenser 1414 will reach the required voltage and initiate the operation of the release circuit. As a result, if the path from the calling subscriber to the junctor is not established within the desired time, the time-out circuit actuates the release circuit, which in turn steps the preference circuit comprising tubes 1420 and 1421 in the manner described above, so that a second attempt, usually over a different path, will be made to establish a connection from a calling subscriber's line to an idle register.

If this path is not established in the desired time, another attempt will be made and so on.

If, however, the connection is not established from the junctor circuit under control of the register to a called subscriber station circuit within the predetermined interval, the time-out circuit actuates the release circuit which in turn causes the various tube circuits described above and the discharges therein to be released or interrupted. Such a condition will be encountered every time an attempt is made to established a connection to a busy line, because when the line is busy, its sleeve conductor is grounded so that the main discharge cathode of the subscriber's line tube will be grounded. Inasmuch as the potential applied from the register and the network of Fig. 18 is insufficient under these conditions to initiate a discharge through the tube, no discharge will be initiated through the start tube and the cathodes of the control gaps of the primary select tubes will not be connected to negative 50 volts. Consequently, no discharge will be initiated through any of these tubes in the predetermined time interval. When the release circuit is actuated by the time-out circuit, relay 1115 will not have been operated since none of the tertiary cross bar cross-point contacts have been operated. As a result, busy tone will be returned to the calling subscriber from the busy tone source through the break contacts of relay 1115 and condenser 1105. It should be noted that condenser 1105 is available for returning ringing induction tone to the calling subscriber station when the called subscriber's bell is being rung if it is so desired. It is also noted that a short spurt of busy tone may be returned to the subscriber during the time the connection is being established to an idle line. This spurt of tone, however, is of such short duration that it will not be noticed by the subscriber.

It is thus apparent that in establishing a call between the two subscriber stations, all of the idle paths from the subscriber station to idle junctors and registers are marked, and that one path is selected by tube lock-out circuits associated with the cross bar switches. The called subscriber's number is dialed into and recorded by the register circuits. Finally, all of the idle paths from the junctor circuit to the called subscriber are marked and one of them selected by means of tube lock-out circuits.

At the completion of the establishment of each connection through the cross bar switches the control circuits employed in establishing connection are restored to normal so that they may be available for establishing other connections through the system. In addition, at the completion of each call, the established paths are interrupted and the switches and related circuits restored to their idle conditions.

What is claimed is:

1. In a communication system, a first group of terminals, a second group of terminals, multistage switching equipment between said two groups of terminals for selectively connecting any one of said first group of terminals with any one of said second group of terminals comprising means for applying a marking condition to one of the terminals of one of said groups of terminals, and means for extending an electrically conductive circuit for said marking condition from said one marked terminal through all idle paths of said multistage switching equipment from said marked terminal to terminals of said other group of terminals, and means constructed to perform a single selecting operation for completely selecting one of the marked paths for establishing a connection between said terminal of the first group and said terminal of the second group.

2. In a telephone switching system multistage switching equipment, subscribers' lines connected thereto, other transmission circuits also connected thereto, equipment for applying a distinctive potential condition to one of said other transmission circuits, electrically conductive control circuits extending through said multistage switching equipment for conveying conductively said distinctive potential condition over all idle paths through said switching equipment from said marked transmission circuit, a lock-out arrangement including means constructed to perform in a single selecting operation the complete selection of one of said idle paths and connecting it to one of said subscribers' lines.

3. In a telephone switching system a plurality of subscribers' lines, a plurality of other transmission circuits, a plurality of register circuits, multistage switching equipment for interconnecting said subscribers' lines with said other transmission circuits and with said register circuits, metallic circuits extending through idle ones of said register circuits and through said transmission circuits and through idle paths through said switching equipment directed towards said subscribers' lines, apparatus responsive to a call from one of said subscribers' lines for applying an electrical marking condition to said metallic circuits, and electronic lockout circuits responsive to said marking condition and interconnected with said switching equipment and with said subscribers' lines for selecting one of the marked paths and connecting the calling subscriber's line thereto.

4. In a telephone switching system a plurality of subscribers' lines, a plurality of other transmission circuits, a plurality of register circuits, multistage switching equipment for interconnecting said subscribers' lines with said other transmission circuits and with said register circuits, an electrically conductive circuit extending through idle ones of said register circuits and through said transmission circuits and through idle paths through said switching equipment directed towards said subscribers' lines, apparatus responsive to a call from one of said subscribers' lines for applying an electrical marking condition to said electrically conducting circuit, and electronic lockout circuits responsive to said marking condition and interconnected with said switching equipment and with said subscribers' lines for selecting one of the marked paths and connecting the called subscriber's line thereto, electronic lock-out means interconnected with said transmission circuits for selecting an idle one of said transmission circuits for connection to said calling subscriber's line.

5. In a telephone switching system a plurality of subscribers' lines, a plurality of other transmission circuits, a plurality of register circuits, multistage switching equipment for interconnecting said subscribers' lines with said other transmission circuits and with said register circuits, metallic circuits extending through idle ones of said register circuits and through ones of said transmission circuits and through idle metallic paths through said switching equipment directed towards said subscribers' lines, apparatus responsive to a call from one of said subscribers' lines for applying a marking condition to said metallic circuits, and electronic lockout circuits responsive to said marking condition and interconnected with said switching equipment and with said subscribers' lines for selecting one of the marked paths and connecting the called subscriber's line thereto, electronically operating lockout means interconnected with said registers for selecting one of said registers and connecting it to a calling subscriber's line.

6. In a telephone switching system a plurality of subscribers' lines, a plurality of other transmission circuits, a plurality of register circuits, multistage switching equipment for interconnecting said subscribers' lines with said other transmission circuits and with said register circuits, electrically conductive control circuits extending through idle ones of said register circuits and through idle ones of said transmission circuits and through idle electrically conductive paths through said switching equipment directed towards said subscribers' lines, means for applying a marking voltage to said control circuits and electronic lock-out circuits responsive to said marking condition and interconnected with said switching equipment and with said subscribers' lines for selecting one of the marked paths and connecting the calling subscriber's line thereto, a release circuit comprising means for freeing the control circuits employed in establishing a connection and rendering said control circuits available for establishing another connection.

7. In a telephone switching system a plurality of subscribers' line circuits extending to subscribers' stations, a plurality of transmission circuits, multistage switching apparatus for interconnecting said subscribers' lines and said transmission circuits, equipment for marking idle ones of said transmission circuits and marking idle paths including electrically conducting circuits extending completely through a plurality of the stages of said switching apparatus, gaseous discharge devices, a lockout circuit interconnecting a plurality of said devices for selecting in a single selective operation, one of the idle paths which extends completely through all of said stages to a calling subscriber's line, and apparatus operating under control of said gaseous discharge device for extending a transmission path through said switching equipment.

8. In a telephone switching system a plurality of subscribers' line circuits extending to subscribers' stations, a plurality of transmission circuits, multistage switching apparatus for interconnecting said subscribers' lines and said transmission circuits, equipment for marking idle ones of said transmission circuits and marking idle paths completely through a plurality of the stages of said switching apparatus, gaseous discharge devices, a lock-out circuit interconecting a plurality of said devices for selecting one of the idle paths which extend to a calling subscriber's line, and apparatus operating under control of said gaseous discharge device for extending a transmission path through said switching equipment, apparatus for designating a called subscriber's line, apparatus for marking all of the transmission paths from one of said transmission circuits towards said subscribers' lines, and means operative under control of the designated called subscriber's line for selecting one of the idle paths extending from said transmission circuit towards said subscribers' lines.

9. In a telephone switching system a plurality of subscribers' lines, a plurality of other transmission circuits arranged in groups, apparatus for selecting idle ones of said other transmission circuits comprising gaseous conduction devices, means for simultaneously applying discharge initiating conditions to said gaseous conduction devices, and apparatus responsive to initiation of at least one discharge through said gaseous conduction devices for preventing the initiation of a similar discharge through any of the other of said gaseous conduction devices, traffic distributing and equalizing means including apparatus for delaying the application of discharge initiating conditions to certain groups only of said devices comprising a condenser and resistance network for delaying the application of electrical conditions to control elements of said electric discharge devices.

10. In a telephone switching system a plurality of subscribers' lines extending to subscribers' stations, a switching station connecting to said subscribers' lines, a plurality of telephone transmission circuits terminating at said switching station, cross bar switches arranged to form a multistage switching system for selectively extending communication path, from said transmission circuits to said subscribers' line circuits, a plurality of gaseous conduction devices, a lockout circuit interconecting a plurality of said devices for selecting one of the idle paths extending between a calling subscriber's line and one of said transmission circuits, apparatus for applying discharge initiating potential conditions to said gaseous conduction devices, apparatus controlled by the number of busy paths through respective ones of said cross bar switches for delaying the application of discharge initiating potentials to gaseous conduction devices associated with paths through said cross bar switches.

11. In a telephone switching system a plurality of subscribers' lines extending to subscribers' stations, a switching station conected to said subscribers' lines, a plurality of telephone transmission circuits terminating at said switching station, cross bar switch arranged to form a multistage switching system for selectively extending communication paths from said transmission circuits to said subscribers' line circuits, a plurality of gaseous conduction devices for selecting one of the idle paths extending between a calling subscriber's line and one of said transmission circuits, apparatus for applying discharge initiating potential conditions to said gaseous conduction devices, apparatus responsive to the number of busy paths through the cross bar switch for progressively delaying by greater increments of time in response to a greater number of busy paths the application of discharge initiating potential conditions to the gaseous discharge devices associated with idle paths through the cross bar switches.

12. In a telephone switching system, a plurality of subscribers' lines, a plurality of cross bar switches connected thereto, a multielement gas discharge tube individual to each of said subscribers' lines, apparatus responsive to a call originating over one of said subscribers' lines for initiating a discharge through the tube individual thereto, means responsive to a discharge through any of said tubes for establishing a path through said switches, apparatus responsive to a designation of one of said subscribers' lines for preventing initiation of a discharge through any of said tubes in response to an attempted initiation of a call from any of the subscribers' lines during the establishing of a path through said switches.

13. In a cross bar telephone system, a plurality of cross bar switches, apparatus for establishing telephone paths through said cross bar switches comprising a plurality of multielement gas discharge tubes for selecting and controlling the establishment of said paths, a plurality of said subscribers' lines connected to said cross bar switches, a gas discharge tube individual to each of said subscribers' lines, apparatus responsive to the initiation of a call on one of said subscribers' lines to cause a discharge through the multielement gas discharge tube individual to said line to control the establishment of a telephone path from said calling line through said switches, other apparatus responsive to signals designating a subscriber's line for creating a discharge through the multielement gas discharge tube individual to said line for establishing a telephone path through said switching equipment to said line.

14. In a cross bar communication system, a plurality of cross bar switches arranged in stages, means for extending communication paths between switches of the different stages, telephone transmission circuits connected to the switches of the terminal stages, apparatus for applying a distinctive potential condition to one of said transmission circuits and electrically conducting circuit conductively extending said potential condition over all of the idle paths through switches of all the stages leading to said transmission circuit, a plurality of multielement gas discharge tubes, connections for applying a discharge initiating condition to said tubes in response to said marking condition, a lock-out circuit interconnecting a plurality of said tubes for completely selecting by a discharge within a single one of said tubes one of said paths extending to the opposite terminal stage having said distinctive potential applied thereto and apparatus responsive to said discharge for actuating the control magnets of said cross bar switches for establishing the selected path therethrough.

15. In a telephone switching system, a plurality of transmission circuits arranged in groups, apparatus for selecting idle ones of said transmission circuits comprising a gaseous conduction device individual to each of said transmission circuits, apparatus interconnected with a plurality of said discharge devices for applying discharge initiating conditions to said gaseous conduction devices, control means for applying discharge initiating conditions to the gaseous conduction devices interconnected with one group of said transmission circuits more favorable than the discharge initiating conditions applied to others of said gaseous conduction devices by said apparatus for applying discharge initiating conditions, apparatus interconnected with said discharge devices and with said control means for changing the group to which the more favorable discharge conditions are applied on successive calls, and apparatus responsive to the initiation of at least one discharge through one of said gaseous conduction devices for preventing the initiating of a similar discharge through any of the other of said gaseous conduction devices.

16. In a telephone switching system a plurality of subscribers' lines, a plurality of cross bar switches connected thereto, a multielement gas discharge tube individual to each of said subscribers' lines, apparatus responsive to a call originating over one of said subscribers' lines for initiating a discharge through the tube individual thereto, means responsive to a discharge through any of said tubes for establishing a path through said switches, apparatus responsive to signals designating one of said subscribers' lines for initiating a discharge through the gas discharge tube individual thereto for causing the establishment of a path through said switches to said designated line and control means interconnected with a plurality of said tubes operating incident to the response of said apparatus responsive to signals designating one of said subscribers' lines for preventing the initiation of a discharge through any of said tubes in response to an attempt to initiate a call by any of said subscribers' lines during the time a path is being established through said switches to said designated line.

17. In a telephone switching system in combination, a plurality of stages of switches, circuits interconnecting each of said stages of switches, a plurality of subscribers' lines interconnected with one of said stages of switches, a plurality of telephone transmission paths also interconnected with one of said stages of switches, a plurality of telephone calling register circuits, control circuits conductively extending from a source of electrical energy through circuits individual to said paths, through said register circuits and through all idle paths through said multistage switching devices toward the stage to which said subscribers' lines are connected, apparatus interconnected with said control circuits for applying said source of energy to said control circuits, and apparatus responsive to the application of said source of energy to said control circuits and interconnected with said multistage switching devices for selecting in a single selecting operation a complete path extending completely through said switches from one of said subscribers' lines to one of said transmission paths.

18. In a telephone switching system in combination, a plurality of switches arranged in stages, interconnecting circuits for connecting each of said stages in tandem with the other of said stages, a plurality of subscribers' lines interconnected with one of the terminal stages of said plurality of stages, a plurality of telephone transmission paths interconnected with another terminal stage of said multistage switching devices, a plurality of calling signal register circuits interconnected with said switching devices, control circuits serially extending through idle ones of said register circuits, through idle ones of said transmission paths and through all idle paths therefrom serially through all the idle paths of each of the stages of said switching devices to the terminal stage to which said subscriber's line is interconnected, a plurality of gaseous conductive tubes, lock-out circuits interconnecting a plurality of said tubes and operating in response to initiation of a discharge through one of said tubes for preventing a discharge through another of said tubes, means interconnecting said switching devices, said tubes and said lock-out circuit for applying a source of electrical energy to said control circuits, circuit connections for conveying energy from said source to said tubes for initiating discharges through one of said tubes, apparatus responsive to a discharge through one of said tubes for completely selecting an entire path extending from said transmission circuits to said subscriber's line.

19. In a telephone switching system in combination, a plurality of switches arranged in stages in tandem, circuits interconnecting each of said stages of switches, a plurality of subscribers' lines interconnected with one of said stages of switches, a plurality of telephone transmission lines interconnected with another one of said stages of switches, a control conductor individual to each of said lines, electrically conducting circuits connected to each of the conductors individual to the lines of one of said plurality of lines which conductive circuits extend conductively through the switches of all the stages which provide idle paths through said switches to the respective line, means for applying a distinctive electrical condition to one of said conductors individual to a line of each of said pluralities of lines, a plurality of gaseous conduction devices, connections to said devices for applying discharge initiating conditions to said devices in response to said distinctive electrical conditions, lock-out circuit elements connected to a plurality of devices operative in response to a discharge through one of said devices for preventing similar discharges through other of said devices, and means responsive to said one discharge to select and establish a path through all of the stages of said switches between the lines individual to the circuits to which said electrical condition is applied.

20. In a telephone switching system, a plurality of transmission circuits arranged in groups, apparatus for selecting idle ones of said transmission circuits comprising a gaseous conduction device individual to each of said transmission circuits, apparatus interconnected with a plurality of said discharge devices for applying discharge initiating conditions to said gaseous conduction devices, control means for applying discharge initiating conditions to the gaseous conduction devices interconnected with one group of said transmission circuits to increase the probability of a discharge being initiated in one of said devices interconnected with said one group of transmission circuits, apparatus interconnected with said conduction devices and with said control means for changing on successive calls the group to which said discharge conditions for increasing the probability of a first discharge are applied, and apparatus responsive to the initiation of at least one discharge through one of said gaseous conduction devices for preventing the initiation of a similar discharge through any of the other of said gaseous conduction devices.

21. In a telephone switching system, a plurality of transmission circuits, apparatus for selecting an idle one of said transmission circuits comprising a gaseous conduction device individual to each of said transmission circuits, apparatus interconnected with a plurality of said conduction devices for applying discharge initiating conditions to said gaseous conduction devices, control means for preconditioning a plurality of said conduction devices to increase the probability that a discharge will be initiated first through one device of the group of said preconditioned conduction devices, apparatus interconnected with said gaseous conduction devices and said control means for changing a group of said devices which are preconditioned on successive calls, and apparatus responsive to the initiation of at least one discharge through one of said gaseous conduction devices for preventing the initiation of a similar discharge to any of the other of said gaseous conduction devices.

22. In a telephone switching system, a plurality of transmission circuits arranged in groups, apparatus for selecting idle ones of said transmission circuits comprising a gaseous conduction device individual to each of said transmission circuits, apparatus interconnected with a plurality of said conduction devices for applying discharge initiating conditions to said gaseous conduction devices, control means for preconditioning a selected plurality of said gaseous conduction devices interconnected with one group of said transmission circuits for increasing the probability of a discharge being initiated through one of said preconditioned devices first, apparatus interconnected with said devices and said control means for changing the preconditioned devices on successive calls, and apparatus responsive to the initiation of at least one discharge through one of said gaseous conduction devices for preventing the initiation of a similar discharge to any of the other of said gaseous conduction devices.

EDMOND BRUCE.
NATHAN I. HALL.

REFERENCES CITED

The following references are of record in the file of this patent:

UNITED STATES PATENTS

| Number | Name | Date |
| --- | --- | --- |
| 2,291,040 | Holden | July 28, 1942 |
| 2,291,224 | Hall | July 28, 1942 |
| 2,291,752 | Parker | Aug. 4, 1942 |
| 2,310,452 | Meacham et al. | Feb. 9, 1943 |
| 2,317,471 | Meacham | Apr. 27, 1943 |
| 2,320,076 | Hall | May 25, 1943 |
| 2,326,458 | Hall | Aug. 10, 1943 |
| 2,326,478 | Meacham | Aug. 10, 1943 |
| 2,326,551 | Mohr | Aug. 10, 1943 |
| 2,348,626 | Holden | May 9, 1944 |
| 2,350,888 | Hall | June 6, 1944 |
| 2,434,989 | Christian | Jan. 27, 1948 |
| 2,510,062 | Bray | June 6, 1950 |